(12) United States Patent
Ogawa et al.

(10) Patent No.: US 8,509,344 B2
(45) Date of Patent: Aug. 13, 2013

(54) RADIO TRANSMISSION DEVICE AND RADIO COMMUNICATION METHOD

(75) Inventors: Yoshihiko Ogawa, Kanagawa (JP); Daichi Imamura, Kanagawa (JP); Takashi Iwai, Ishikawa (JP); Katsuhiko Hiramatsu, Leuven (BG); Tomofumi Takata, Ishikawa (JP); Atsushi Matsumoto, Ishikawa (JP)

(73) Assignee: Panasonic Corporation, Osaka (JP)

( * ) Notice: Subject to any disclaimer, the term of this patent is extended or adjusted under 35 U.S.C. 154(b) by 672 days.

(21) Appl. No.: 12/672,256

(22) PCT Filed: Aug. 7, 2008

(86) PCT No.: PCT/JP2008/002151
§ 371 (c)(1),
(2), (4) Date: Feb. 4, 2010

(87) PCT Pub. No.: WO2009/019878
PCT Pub. Date: Feb. 12, 2009

(65) Prior Publication Data
US 2011/0075760 A1 Mar. 31, 2011

(30) Foreign Application Priority Data

Aug. 8, 2007 (JP) .................................. 2007-207186
Oct. 26, 2007 (JP) .................................. 2007-279224

(51) Int. Cl.
*H04L 27/00* (2006.01)
(52) U.S. Cl.
USPC ........... 375/295; 370/208; 370/329; 370/350; 375/145; 375/240; 375/364; 375/365; 375/366
(58) Field of Classification Search
None
See application file for complete search history.

(56) References Cited

U.S. PATENT DOCUMENTS

| 7,911,935 B2 * | 3/2011 | Akita et al. .................... 370/208 |
| 2005/0226140 A1 | 10/2005 | Zhuang |
| 2008/0101214 A1 * | 5/2008 | Jitsukawa et al. ............. 370/208 |
| 2010/0002804 A1 | 1/2010 | Ogawa |

FOREIGN PATENT DOCUMENTS
WO 2008/093716 8/2008

OTHER PUBLICATIONS

Extended European Search Report dated Oct. 19, 2011.
3GPP TSG RAN WG1 Meeting #48, "Criteria to decide Zadoff-Chu sequence length for EUTRA uplink reference signal," NEC Group, R1-070877, Feb. 12-16, 2007, pp. 1-4.
International Search Report dated Nov. 11, 2008.
Y. Ogawa et al., "Pilot signal generation scheme using frequency dependent cyclic shift sequence for inter-cell interference reduction," IEICE Technical Report, vol. 107, No. 518, Feb. 27, 2008, pp. 341-346.

(Continued)

Primary Examiner — Adolf Dsouza
(74) Attorney, Agent, or Firm — Dickinson Wright PLLC

(57) ABSTRACT

A radio transmission device and a radio communication method employ sequence length decision units which hold a correspondence in which one basic sequence length is set for a plurality of transmission bandwidths. The sequence length decision units acquire transmission bandwidth information and decide a sequence length corresponding to the acquired transmission bandwidth information. A decision is made as to which of the cyclic extension process or the truncation process is to be executed on a Zadoff-Chu sequence according to the sizes of the acquired transmission bandwidth information and the basic sequence length. Then, a difference between the transmission bandwidth and the basic sequence length, i.e., the number of possible cyclic extension/truncation symbols, is obtained.

26 Claims, 23 Drawing Sheets

(56) References Cited

OTHER PUBLICATIONS

3GPP RAN WG1 #49bis, "Selection between Truncation and Cyclic Extension for UL RS Generation," Motorola, R1-072683, Jun. 26, 2007, pp. 1-6.

TSG-RAN WGI Meeting #47bis, "Zadoff-Chu sequence allocation on RACH for complexity reduction," Panasonic, NTT DoCoMo, R1-070189, Jan. 19, 2007, pp. 1-4.

3GPP TSG RAN WG1 Meeting #47bis, "Ways to Mitigate Frequency Offset with CAZAC Cyclic Shift," LG Electronics, R1-070227, Jan. 19, 2007, pp. 1-8.

3GPP TSG RAN WG1 Meeting #48bis, "Realization of cyclic shift restriction for RACH", Panasonic, R1-071518, Mar. 30, 2007, pp. 1-5.

3GPP TSG RAN WG1 Meeting #49bis, "RACH sequence allocation and indication to the cell," Panasonic, NTT DoCoMo, R1-072800, Jun. 29, 2007, pp. 1-9.

3GPP TSG RAN WG1 Meeting #50, "Frequency dependent PUSCH DM-RS generation method with considering eNB-specific allocation," Panasonic, R1-073628, Aug. 24, 2007, pp. 1-5.

3GPP TS 36.211 V1.1.0, "Physical Channels and Modulation (Release 8)," Technical Specification, May 2007, pp. 1-34.

3GPP TSG RAN WG1 Meeting #49, "Necessity of Multiple Bandwidths for Sounding Reference Signals," NTT DoCoMo, Fujitsu, Mitsubishi Electric, NEC, Panasonic, Sharp, Toshiba Corporation, R1-072429, May 11, 2007, pp. 1-10.

3GPP RAN WG1 #48bis, "Selection between Truncation and Cyclic Extension for UL RS Generation," Motorola, R1-071339, Mar. 30, 2007, pp. 1-6.

\* cited by examiner

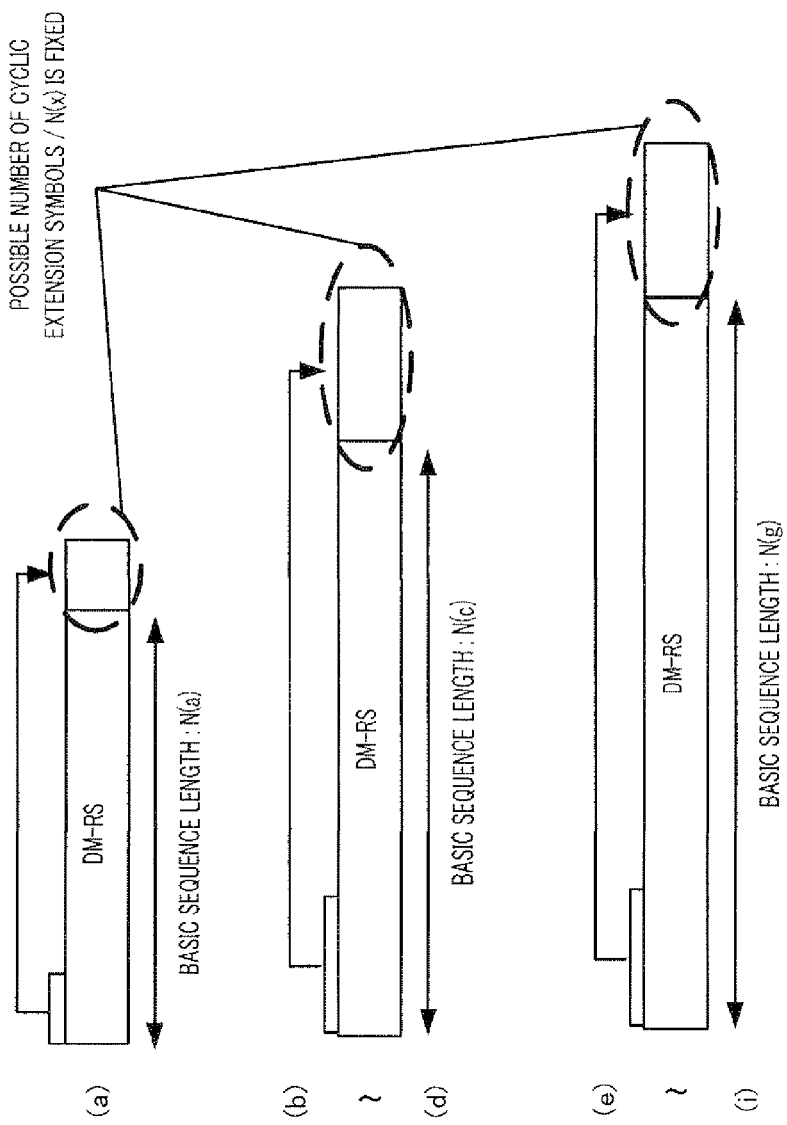
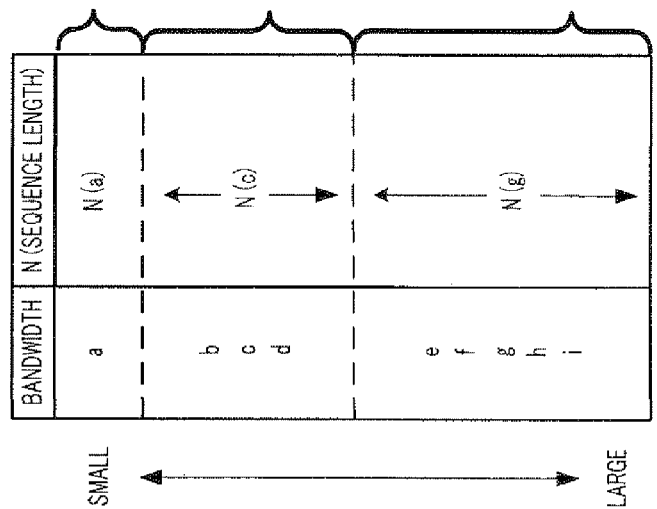
FIG.11

| BASIC SEQUENCE LENGTH | RPF=1 | | RPF=2 | | RPF=3 | |
|---|---|---|---|---|---|---|
| | NUMBER OF SUBCARRIERS OF TRANSMISSION BANDWIDTH (NUMBER OF RB'S) | NUMBER OF SYMBOLS SUBJECT TO EXTENSION OR TRUNCATION | NUMBER OF SUBCARRIERS OF TRANSMISSION BANDWIDTH (NUMBER OF RB'S) | NUMBER OF SYMBOLS SUBJECT TO EXTENSION OR TRUNCATION | NUMBER OF SUBCARRIERS OF TRANSMISSION BANDWIDTH (NUMBER OF RB'S) | NUMBER OF SYMBOLS SUBJECT TO EXTENSION OR TRUNCATION |
| 11 | 12 (1RB) | +1 | 6 (1RB)<br>12 (2RB)<br>18 (3RB) | −5<br>+1<br>+7 | 4 (1RB)<br>8 (2RB)<br>12 (3RB)<br>16 (4RB)<br>20 (5RB) | −7<br>−3<br>+1<br>+5<br>+9 |
| 23 | 24 (2RB) | +1 | 24 (4RB)<br>30 (5RB) | +1<br>+7 | 24 (6RB)<br>28 (7RB)<br>32 (8RB) | +1<br>+5<br>+9 |
| 31 | 36 (3RB) | +5 | 36 (6RB)<br>42 (7RB) | +5<br>+11 | 36 (9RB)<br>40 (10RB)<br>44 (11RB) | +5<br>+9<br>+13 |

FIG.19

| BANDWIDTH | NUMBER OF SUBCARRIERS | N (SEQUENCE LENGTH) |
|---|---|---|
| 1RB | 12 | 11 |
| 2RB | 24 | 23 |
| 3RB | 36 | 31 |
| 4RB | 48 | 47 |
| 5RB | 60 | 59 |
| 6RB | 72 | 71 |
| 7RB | — | — |
| 8RB | 96 | 89 |
| 9RB | 108 | 107 |
| 10RB | 120 | 113 |
| 11RB | — | — |
| 12RB | 144 | 143 |
| ... | ... | ... |

SMALL ←→ LARGE

FIG.21

| Sequence Length | RPF-1 | | RPF-2 | | |
|---|---|---|---|---|---|
| | Number of subcarriers of transmission bandwidth (Number of RB's) | Number of symbols subject to extension or truncation | Number of subcarriers of transmission bandwidth (Number of RB's) | Number of symbols subject to extension or truncation | |
| 11 | 12 (1RB) | +1 | 6 (1RB) | -5 | |
| | | | 12 (2RB) | +1 | |
| | | | 18 (3RB) | +7 | |
| 23 | 24 (2RB) | +1 | 24 (4RB) | +1 | |
| | | | 30 (5RB) | +7 | |
| 31 | 36 (3RB) | +5 | 36 (6RB) | -5 | |
| | | | 42 (7RB) | +11 | |
| 47 | 48 (4RB) | +1 | 48 (8RB) | +1 | |
| | | | 54 (9RB) | +7 | |
| 59 | 60 (5RB) | +1 | 60 (10RB) | +1 | |
| | | | 66 (11RB) | +7 | |
| 71 | 72 (6RB) | +1 | 72 (12RB) | +1 | ← SELECTED FROM SEQUENCE LENGTHS AVAILABLE TO DMRS |
| | | | 78 (13RB) | +7 | |
| | | | 84 (14RB) | +13 | |
| — | — | — | 90 (15RB) | +19 | |
| 89 | 96 (8RB) | +7 | 96 (16RB) | +7 | |
| ... | ... | ... | ... | ... | |

SMALL ←———————————→ LARGE

FIG.22

RADIO TRANSMISSION DEVICE AND RADIO COMMUNICATION METHOD

TECHNICAL FIELD

The present invention relates to a wireless transmitting apparatus and wireless communication method using CAZAC (Constant Amplitude and Zero-Autocorrelation Code) sequences such as ZC (Zadoff-Chu) sequences or sequences corresponding to CAZAC sequences, as reference signals.

BACKGROUND ART

In 3GPP LTE (3rd Generation Partnership Project Long-Term Evolution), RS's (Reference Signals) are used to estimate an uplink or downlink channel. Here, RS's include a DM (DeModulation)-RS used for channel estimation for data demodulation and an SRS (Sounding RS) used for channel quality estimation for frequency scheduling.

In an uplink of 3GPP LTE, a plurality of bandwidths are studied as an RS bandwidth. In Non-Patent Document 1, studies are underway to transmit a DM-RS by the same bandwidth as the data transmission bandwidth. Also, in Non-Patent Document 2, studies are underway to transmit an SRS by three bandwidths of 1.25 MHz, 5 MHz and 10 MHz. Here, the following explanation presumes that the transmission bandwidth and the number of RB's (Resource Blocks) are synonymous.

Also, in 3GPP LTE, studies are underway to use a ZC sequence, which is a kind of a CAZAC sequence, as an uplink RS. The time domain representation of a ZC sequence is represented by following equation 1.

(Equation 1)
$$f_r(k) = \begin{cases} \exp\left\{\frac{-j2\pi r}{N}\left(\frac{k(k+1)}{2}+pk\right)\right\}, \text{ when } N \text{ is odd}, k=0,1,\ldots,N-1 \\ \exp\left\{\frac{-j2\pi r}{N}\left(\frac{k^2}{2}+pk\right)\right\}, \text{ when } N \text{ is even}, k=0,1,\ldots,N-1 \end{cases} \quad [1]$$

Here, N is the sequence length, r is the ZC sequence number in the time domain, and N and r are coprime. Also, p is an arbitrary integer (generally p=0). Although a case will be explained below where the sequence length N is an odd number, a case is also possible where a sequence length N is an even number.

A cyclic shift ZC sequence acquired by cyclically shifting the ZC sequence represented by equation 1 in the time domain, or ZC-ZCZ (Zadoff-Chu Zero Correlation Zone) sequence is represented by following equation 2.

(Equation 2)
$$f_{r,m}(k) = \exp\left\{\frac{-j2\pi r}{N}\left(\frac{(k\pm m\Delta)(k\pm m\Delta+1)}{2}\right)+pk\right\}, \quad [2]$$
when $N$ is odd, $k=0,1,\ldots,N-1$ Here, m is the cyclic shift sequence number, and $\Delta$ is the cyclic shift value. The "$\pm$" sign may be either plus or minus. Also, the frequency domain sequence, transformed by performing Fourier transform of the time domain ZC sequence in equation 1, is also a ZC sequence. The frequency domain representation of a ZC sequence is represented by following equation 3.

(Equation 3)
$$F_u(k) = \exp\left\{\frac{-j2\pi u}{N}\left(\frac{k(k+1)}{2}+qk\right)\right\}, \quad [3]$$
when $N$ is odd, $k=0,1,\ldots,N-1$ Here, N is the sequence length, u is the ZC sequence number in the frequency domain, and N and u are coprime. Also, q is an arbitrary integer (generally q=0). Similarly, given that cyclic shift and phase rotation form a Fourier transform pair, a frequency domain representation of the time domain ZC-ZCZ sequence in equation 2 is shown in following equation 4.

(Equation 4)
$$F_{u,m}(k) = \exp\left\{\frac{-j2\pi u}{N}\left(\frac{k(k+1)}{2}+qk\right) \pm \frac{j2\pi\Delta m}{N}k\right\}, \quad [4]$$
when $N$ is odd, $k=0,1,\ldots,N-1$ Here, N is the sequence length, u is the ZC sequence number in the frequency domain, and N and u are coprime. Also, m is the cyclic shift sequence number, $\Delta$ is the cyclic shift interval, and q is an arbitrary integer (generally, q=0).

With the ZC-ZCZ sequence represented by equation 4, two kinds of sequences of different sequence numbers (u) and sequences of different cyclic shift values ($\Delta$m), can be used for an RS (see FIG. 1). Here, sequences of different sequence numbers are semi-orthogonal (i.e. low-correlation and substantially orthogonal) to each other. On the other hand, sequences of different cyclic shift values are orthogonal to each other and therefore have good cross-correlation characteristics between sequences. Here, given the characteristics of CAZAC sequences, sequences of different cyclic shift values make it easy to provide orthogonality between cells between which frame synchronization is established.

Next, a specific method of generating an RS based on different transmission bandwidths (i.e. different numbers of RB's) will be described. Generally, (N−1) sequences can be generated from a ZC sequence of a prime-number sequence length N, so that it is possible to increase a sequence reuse factor compared to a case where the sequence length N is not a prime number. However, for example, in the system disclosed in Non-Patent Document 3, multiples of 12 subcarriers (corresponding to 1 RB) are determined as the number of subcarriers in the transmission band, and, if a ZC sequence of a prime-number sequence length is adopted, the ZC sequence length and the number of subcarriers in the transmission band do not match. To be more specific, when the transmission band is 2 RB's, although the number of subcarriers is 24, prime numbers close to 24 are 23 and 29, so that the ZC sequence length is 23 or 29.

Here, as a method of matching a ZC sequence of a prime-number sequence length N to the number of subcarriers in the transmission band, Patent Document 1 discloses cyclic extension and truncation. As shown in FIG. 2, cyclic extension refers to the method of using the maximum prime number as the sequence length, among the prime numbers less than the number of subcarriers in the transmission band, and, according to the number of subcarriers in the transmission band, copying the head part of the ZC sequence and attaching the head part to the tail end of that ZC sequence. On the other hand, truncation refers to the method of using the minimum prime number as the sequence length, among the prime numbers greater than the number of subcarriers in the transmission band, and, according to the number of subcarriers in the transmission band, removing part over the number of subcarriers from that ZC sequence.

Also, in Non-Patent Document 3, studies are underway to adopt, as the sequence length (N), the minimum prime number closest to the number of subcarriers, on a per transmission bandwidth (i.e. the number of RB's) basis. For example, when truncation is adopted, the sequence length is 13 in a bandwidth of 1 RB (i.e. 12 subcarriers), the sequence length is 29 in a bandwidth of 2 RB's (i.e. 24 subcarriers), and the sequence length is 37 in a bandwidth of 3 RB's (i.e. 36 subcarriers).

Patent Document 1: U.S. Patent Application Laid-Open No. 20050226140, specification Non-Patent Document 1: TS36.211 V1.1.0, 3GPP TSG RAN, "Physical Channels and Modulation (Release 8)"

Non-Patent Document 2: NTT DoCoMo, Fujitsu, Mitsubishi Electric, NEC, Panasonic, Sharp, Toshiba Corporation, R1-072429, "Necessity of Multiple Bandwidths for Sounding Reference Signals", 3GPP TSG RAN WG1 Meeting #49, Kobe, Japan, May 7-11, 2007

Non-Patent Document 3: Motorola, R1-071339, "Selection between Truncation and Cyclic Extension for UL RS Generation", 3GPP TSG RAN WG1 Meeting #48bis, St. Julian's, Malta, Mar. 26-30, 2007

DISCLOSURE OF INVENTION

Problems to be Solved by the Invention

According to the method disclosed in above Patent Document 1, it is possible to suppress the increase of cross correlation between ZC sequences of the same sequence length to the minimum extent. However, because ZC sequences of different sequence lengths are transmitted between adjacent cells, as shown in FIG. 3, low cross correlation is not ensured between ZC sequences of different sequence lengths N's, which causes mutual interference and degrades receiving performance significantly. Here, the above problem occurs not only between adjacent cells, but also occurs when ZC sequences of different sequence lengths are transmitted in a cell.

For example, if cell #1 uses sequence length N(b) and cell #2 uses sequence length N(c), low cross correlation cannot be maintained. Further, there is a case where cross correlation becomes extremely high depending on a combination of sequence numbers r's of ZC sequences, which causes significant error in channel estimation and degrades the receiving performance significantly.

Further, because varying sequence lengths N(x) (x=a, b, . . . ) are used on a per transmission bandwidth (i.e. the number of RB's) basis, when the number of kinds of available bandwidths increases, the number of ZC sequences used in a system increases in a wireless communication terminal apparatus and wireless communication base station apparatus. Therefore, as shown in FIG. 4, the circuit scale of, for example, a memory for storing ZC sequences increases, and the amount of calculations required for sequence generation increases.

It is therefore an object of the present invention to provide a wireless transmitting apparatus and wireless communication method for reducing interference between sequences and reducing the circuit scale and the amount of calculations even in the case of transmitting RS's by different transmission bandwidths.

Means for Solving the Problem

The wireless transmitting apparatus of the present invention employs a configuration having: a sequence length determining section that holds an association relationship associating a basic sequence length per a plurality of transmission bandwidths to which a reference signal is allocated, determines a basic sequence length associated with a transmission bandwidth indicated by acquired transmission bandwidth information, and determines a difference between the determined basic sequence length and the transmission bandwidth indicated by the transmission bandwidth information, as a number of cyclic extension and truncation symbols; a sequence generating section that generates a constant amplitude and zero-autocorrelation code sequence of the determined basic sequence length; a cyclic extension and truncation processing section that performs one of cyclic extension processing and truncation processing on the constant amplitude and zero-autocorrelation code sequence of the basic sequence length, based on the transmission bandwidth indicated by the transmission bandwidth information and the number of cyclic extension and truncation symbols; and a transmitting section that transmits the constant amplitude and zero-autocorrelation code sequence subjected to one of the cyclic extension processing and the truncation processing, as a reference signal.

The wireless transmitting apparatus of the present invention employs a configuration having: a transmission bandwidth determining section that determines a transmission bandwidth; a sequence generating section that generates a constant amplitude and zero-autocorrelation code sequence of a basic sequence length associated with the determined transmission bandwidth; and a transmitting section that transmits the sequence generated in the sequence generating section, in which the sequence generating section generates a constant amplitude and zero-autocorrelation code sequence of a common basic sequence length between R transmission bandwidths (where R is a natural number equal to or greater than 2).

The wireless communication method of the present invention includes: a sequence length determining step of holding an association relationship associating a basic sequence length per a plurality of transmission bandwidths to which a reference signal is allocated, determining a basic sequence length associated with a transmission bandwidth indicated by acquired transmission bandwidth information, and determining a difference between the determined basic sequence length and the transmission bandwidth indicated by the transmission bandwidth information, as a number of cyclic extension and truncation symbols; a sequence generating step of generating a constant amplitude and zero-autocorrelation code sequence of the determined basic sequence length; a cyclic extension and truncation processing step of performing one of cyclic extension processing and truncation processing on the constant amplitude and zero-autocorrelation code sequence of the basic sequence length, based on the transmission bandwidth indicated by the transmission bandwidth information and the number of cyclic extension and truncation symbols; and a transmitting step of transmitting the constant amplitude and zero-autocorrelation code sequence subjected to one of the cyclic extension processing and the truncation processing, as a reference signal.

Advantageous Effect of the Invention

According to the present invention, even in the case of transmitting an RS with different transmission bandwidths, it is possible to reduce interference between sequences and reduce the circuit scale and the amount of calculations.

BRIEF DESCRIPTION OF DRAWINGS

FIG. 11 illustrates a sequence length determining section according to Embodiment 3 of the present invention in detail;

FIG. 19 shows the relationships between the basic sequence length, the number of subcarriers in a transmission bandwidth and the number of cyclic extension and truncation symbols, according to Embodiment 6 of the present invention;

FIG. 21 shows the relationships between the transmission bandwidth (the number of RB's), the number of transmission subcarriers and the sequence length;

FIG. 22 shows the relationships between the basic sequence length, the number of subcarriers in the transmission bandwidth and the number of cyclic extension and truncation symbols, according to Embodiment 7 of the present invention.

BEST MODE FOR CARRYING OUT THE INVENTION

Figure 1:
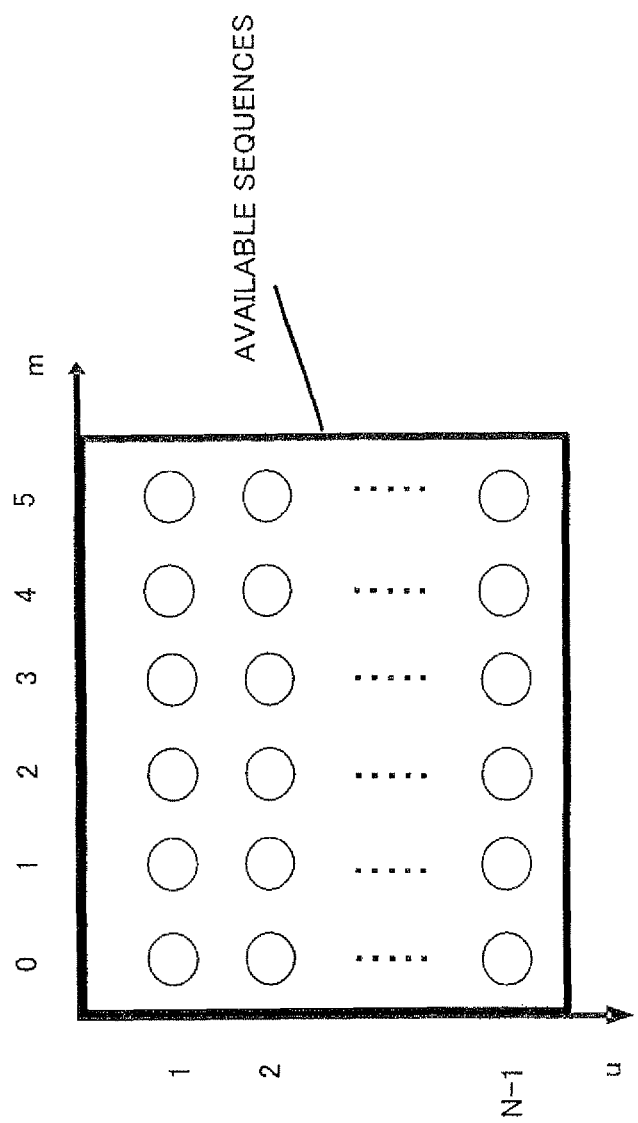
FIG. 1 shows ZC sequences that can be used as reference signals.
Figure 2:
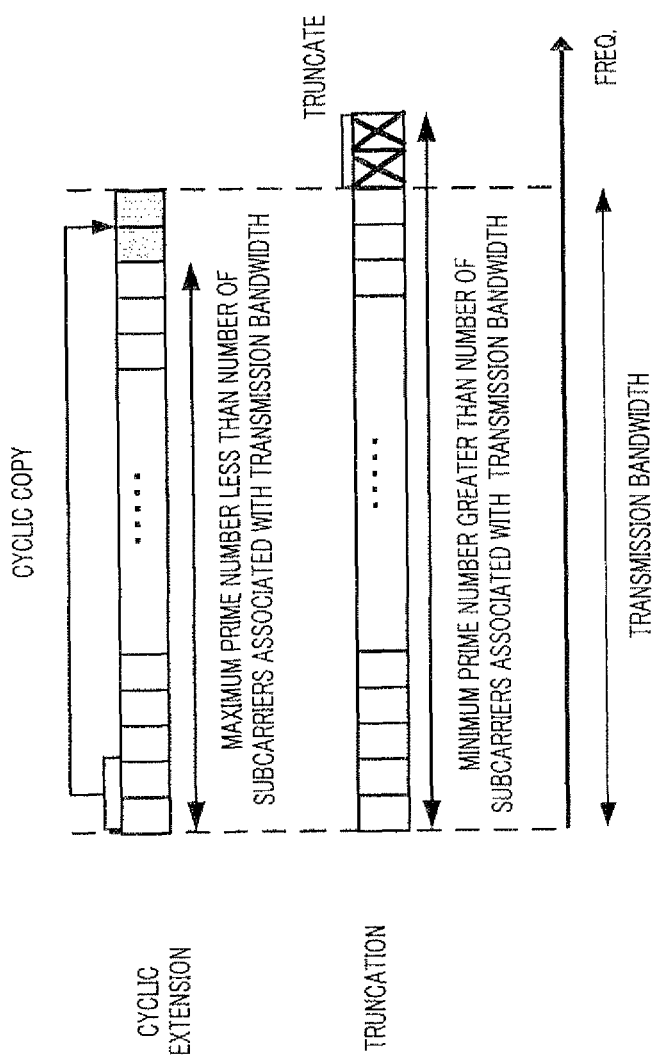
FIG. 2 illustrates cyclic extension and truncation.
Figure 3:
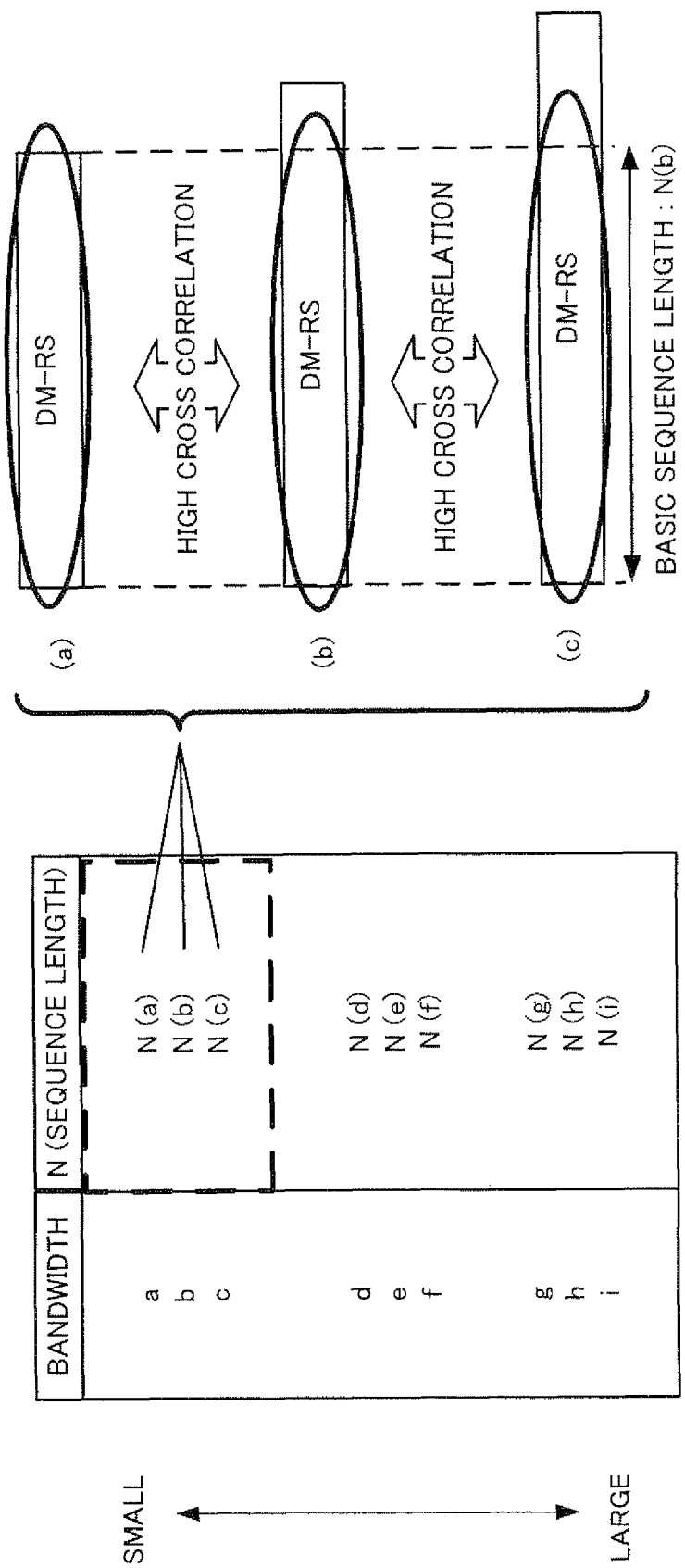
FIG. 3 shows cross correlation between ZC sequences of different sequence lengths N's.
Figure 4:
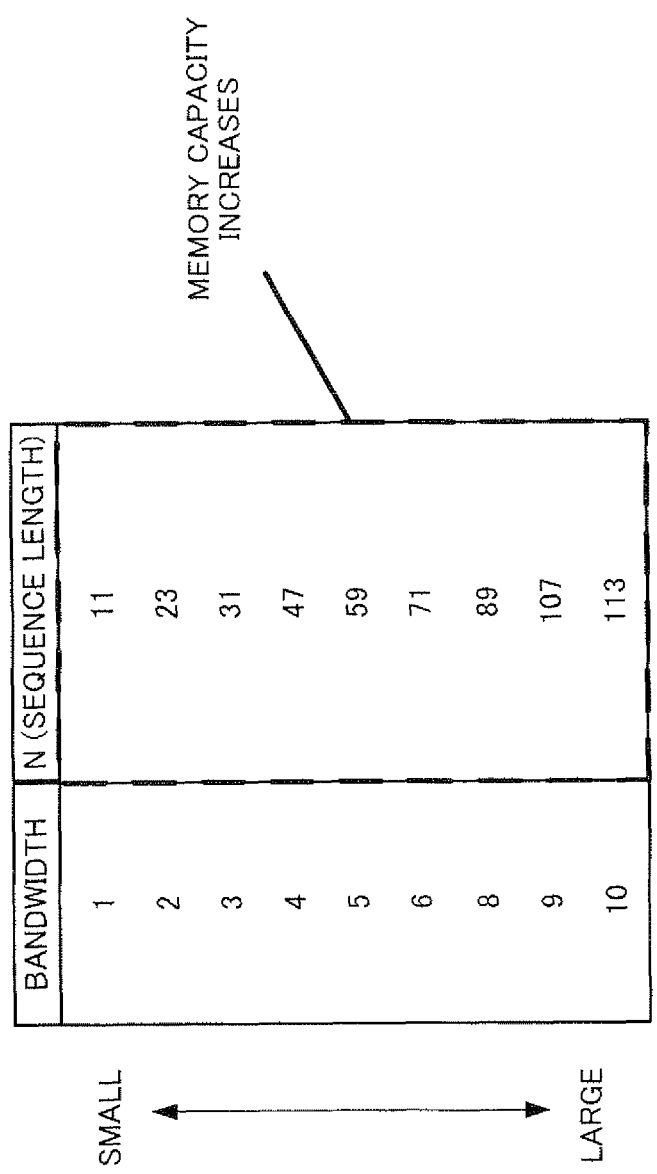
FIG. 4 illustrates an increase in the circuit scale of, for example, a memory for storing ZC sequences.

Embodiments of the present invention will be explained below in detail with reference to the accompanying drawings.

Embodiment 1

The configuration of terminal 100 according to Embodiment 1 of the present invention will be explained using FIG. 5. RF receiving section 102 performs receiving processing such as down-conversion and A/D conversion on a signal received via antenna 101, and outputs the signal subjected to receiving processing to demodulating section 103. Demodulating section 103 performs equalization processing and demodulation processing on the signal outputted from RF receiving section 102, and outputs the signal subjected to these processing to decoding section 104. Decoding section 104 performs decoding processing on the signal outputted from demodulating section 103, and extracts a data signal and control information. In the extracted control information, transmission bandwidth information (i.e. the number of RB's) is outputted to sequence length determining section 105, and RB allocation information is outputted to mapping section 109.

Sequence length determining section 105 determines the sequence length of a ZC sequence and the number of symbols subject to cyclic extension or truncation (hereinafter "the number of cyclic extension and truncation symbols"), based on the transmission bandwidth information (about the number of RB's) outputted from decoding section 104. The determined sequence length of the ZC sequence is outputted to ZC sequence generating section 107, and the number of cyclic extension and truncation symbols is outputted to cyclic extension and truncation processing section 108.

RS generating section 106 is provided with ZC sequence generating section 107, cyclic extension and truncation processing section 108, mapping section 109, IFFT section 110 and cyclic shift section 111, and generates an RS based on the sequence length of the ZC sequence outputted from sequence length determining section 105 and the sequence number information of ZC sequence included in control information, and outputs the RS to multiplexing section 117. The configuration inside RS generating section 106 will be explained below.

ZC sequence generating section 107 generates a ZC sequence represented in the frequency domain (see equation 3) using, for example, sequence number information and the sequence length outputted from sequence length determining section 105, and outputs the result to cyclic extension and truncation processing section 108.

Cyclic extension and truncation processing section 108 performs cyclic extension processing or truncation processing on the ZC sequence outputted from ZC sequence generating section 107, based on the number of cyclic extension and truncation symbols outputted from sequence length determining section 105, and outputs the result to mapping section 109.

Mapping section 109 maps the ZC sequence outputted from cyclic extension and truncation processing section 108 in a band corresponding to the transmission band of the terminal, based on the RB allocation information outputted from decoding section 104, and outputs the mapped ZC sequence to IFFT section 110. IFFT section 110 performs IFFT (Inverse Fast Fourier Transform) processing on the ZC sequence outputted from mapping section 109, and outputs the ZC sequence subjected to IFFT processing to cyclic shift section 111. Cyclic shift section 111 applies a cyclic shift to the ZC sequence outputted from IFFT section 110, and outputs the result to multiplexing section 117.

Encoding section 112 encodes transmission data and outputs the encoded data to modulating section 113. Modulating section 113 modulates the encoded data outputted from encoding section 112, and outputs the modulated signal to DFT section 114. DFT section 114 performs DFT (Discrete Fourier Transform) processing on the modulated signal outputted from modulating section 113, transforms the time domain signal into a frequency domain signal, and outputs the transformed frequency domain signal to RB allocating section 115. RB allocating section 115 allocates the signal outputted from DFT section 114 to an RB and outputs the signal allocated to the RB, to IFFT section 116. IFFT section 116 performs IFFT processing on the signal outputted from RB allocating section 115, and outputs the signal subjected to IFFT processing to multiplexing section 117.

Multiplexing section 117 time-multiplexes the transmission data outputted from IFFT section 116 and the ZC sequence (i.e. RS) outputted from cyclic shift section 111, and outputs the multiplexed signal to RF transmitting section 118. Here, the multiplexing method in multiplexing section 117 is not limited to time multiplexing, and it is equally possible to adopt frequency multiplexing, code multiplexing and IQ multiplexing on the complex space.

RF transmitting section 118 performs transmission processing such as D/A conversion, up-conversion and amplification on the multiplexing signal outputted from multiplexing section 117, and transmits by radio the signal subjected to transmission processing from antenna 101.

Figure 6:
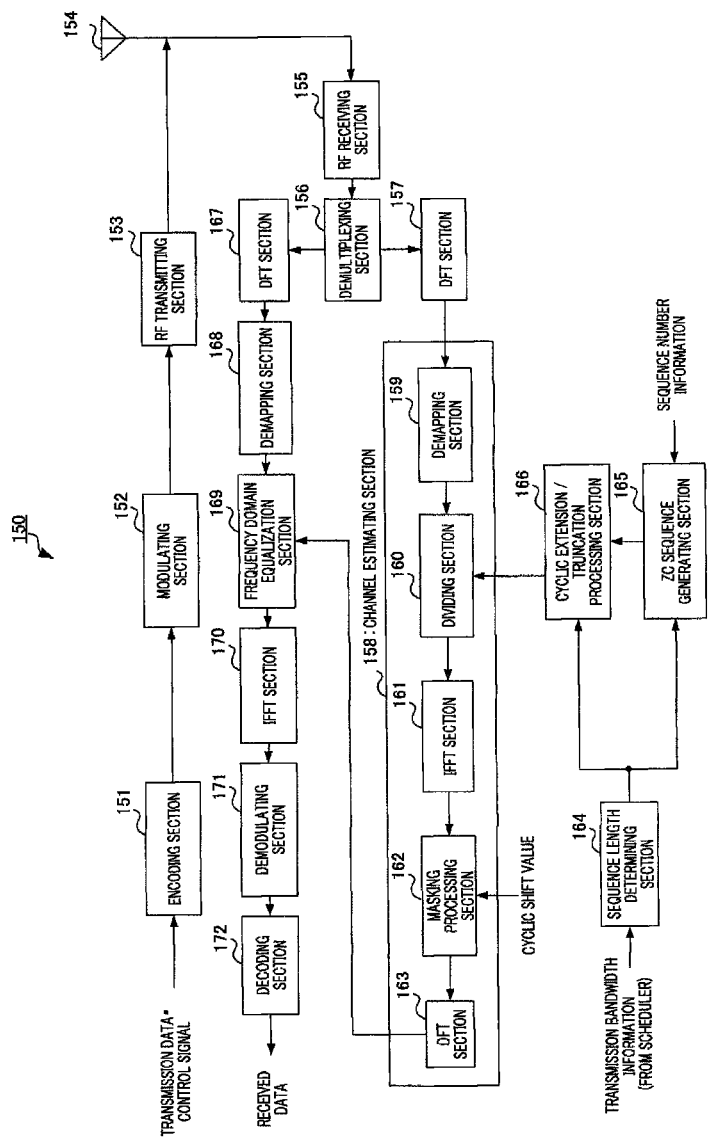
FIG. 6 is a block diagram showing the configuration of a base station according to Embodiment 1 of the present invention.

Next, the configuration of base station 150 according to Embodiment 1 of the present invention will be explained using FIG. 6. Encoding section 151 encodes transmission data and control signal, and outputs the encoded data to modulating section 152. Modulating section 152 modulates the encoded data and outputs the modulated signal to RF transmitting section 153. RF transmitting section 153 performs transmission processing such as D/A conversion, up-conversion and amplification on the modulated signal, and transmits by radio the signal subjected to transmission processing from antenna 154.

RF receiving section 155 performs reception processing such as down-conversion and A/D conversion on a signal received via antenna 154, and outputs the signal subjected to reception processing to demultiplexing section 156. Demultiplexing section 156 demultiplexes the signal outputted from RF receiving section 155 into the RS, the data signal and the control signal, and outputs the RS to DFT section 157, and the data signal and the control signal to DFT section 167.

DFT section 157 performs DFT processing on the RS outputted from demultiplexing section 156, converts the time domain signal into a frequency domain signal, and outputs the transformed frequency domain RS to demapping section 159 in channel estimating section 158.

Channel estimating section 158 is provided with demapping section 159, dividing section 160, IFFT section 161, masking processing section 162 and DFT section 163, and estimates a channel based on the RS outputted from DFT section 157. The configuration inside channel estimating section 158 will be explained below in detail.

Demapping section 159 extracts part corresponding to the transmission band of each terminal from the signal outputted from DFT section 157, and outputs the extracted signals to dividing section 160. Dividing section 160 divides the signals outputted from demapping section 159 using a ZC sequence outputted from cyclic extension and truncation processing section 166, and outputs the division result (i.e. correlation value) to IFFT section 161. IFFT section 161 performs IFFT processing on the signal outputted from dividing section 160, and outputs the signal subjected to IFFT processing to masking processing section 162.

Masking processing section 162 extracts the correlation value in the interval (i.e. detection window) in which there is the correlation value of the desired cyclic shift sequence, by performing masking processing on the signal outputted from IFFT section 161 based on the cyclic shift value allocated to terminal 100, and outputs the extracted correlation value to DFT section 163.

DFT section 163 performs DFT processing on the correlation value outputted from masking processing section 162, and outputs the correlation value subjected to DFT processing to frequency domain equalization section 169. Here, the signal outputted from DFT section 163 represents the channel frequency response.

Sequence length determining section 164 determines the sequence length of the ZC sequence and the number of cyclic extension and truncation symbols of the ZC sequence based on transmission bandwidth (i.e. the number of RB's) information outputted from a scheduler (not shown), outputs the determined sequence length to ZC sequence generating section 165 and outputs the number of cyclic extension and truncation symbols to cyclic extension and truncation processing section 166.

ZC sequence generating section 165 generates a ZC sequence represented in the frequency domain (i.e. represented by equation 3) using, for example, the sequence length outputted from sequence length determining section 164 and sequence number information included in control information, and outputs the result to cyclic extension and truncation processing section 166.

Cyclic extension and truncation processing section 166 performs cyclic extension processing or truncation processing on the ZC sequence outputted from ZC sequence generating section 165, based on the number of cyclic extension and truncation symbols outputted from sequence length determining section 164, and outputs the result to dividing section 160. Here, assume that the terminal and the base station share the relationship between the transmission bandwidth (i.e. the number of RB's) and the sequence length (i.e. the basic sequence length).

DFT section 167 performs DFT processing on the data signal and control signal outputted from demultiplexing section 156, transforms the time domain signals into frequency domain signals, and outputs the transformed frequency domain data signal and control signal to demapping section 168.

Demapping section 168 extracts the data signal and control signal in the region corresponding to the transmission band of each terminal, from the signals outputted from DFT section 167, and outputs the extracted signals to frequency domain equalization section 169.

Frequency domain equalization section 169 performs equalization processing on the data signal and control signal outputted from demapping section 168, using the signal (i.e. channel frequency response) outputted from DFT section 163 in channel estimating section 158, and outputs the signals subjected to equalization processing to IFFT section 170.

IFFT section 170 performs IFFT processing on the data signal and control signal outputted from frequency domain equalization section 169, and outputs the signals subjected to IFFT processing to demodulating section 171. Demodulating section 171 performs demodulation processing on the signals subjected to IFFT processing, and outputs the signal subjected to demodulation processing to decoding section 172. Decoding section 172 performs decoding processing on the signals subjected to demodulation processing, and extracts received data.

Here, if the base station needs not have masking processing section 162 if not using a cyclic shift sequence. Also, although a case has been described above where the base station performs equalization processing of received data in the frequency domain, it is equally possible to perform equalization processing in the time domain.

Figure 7:
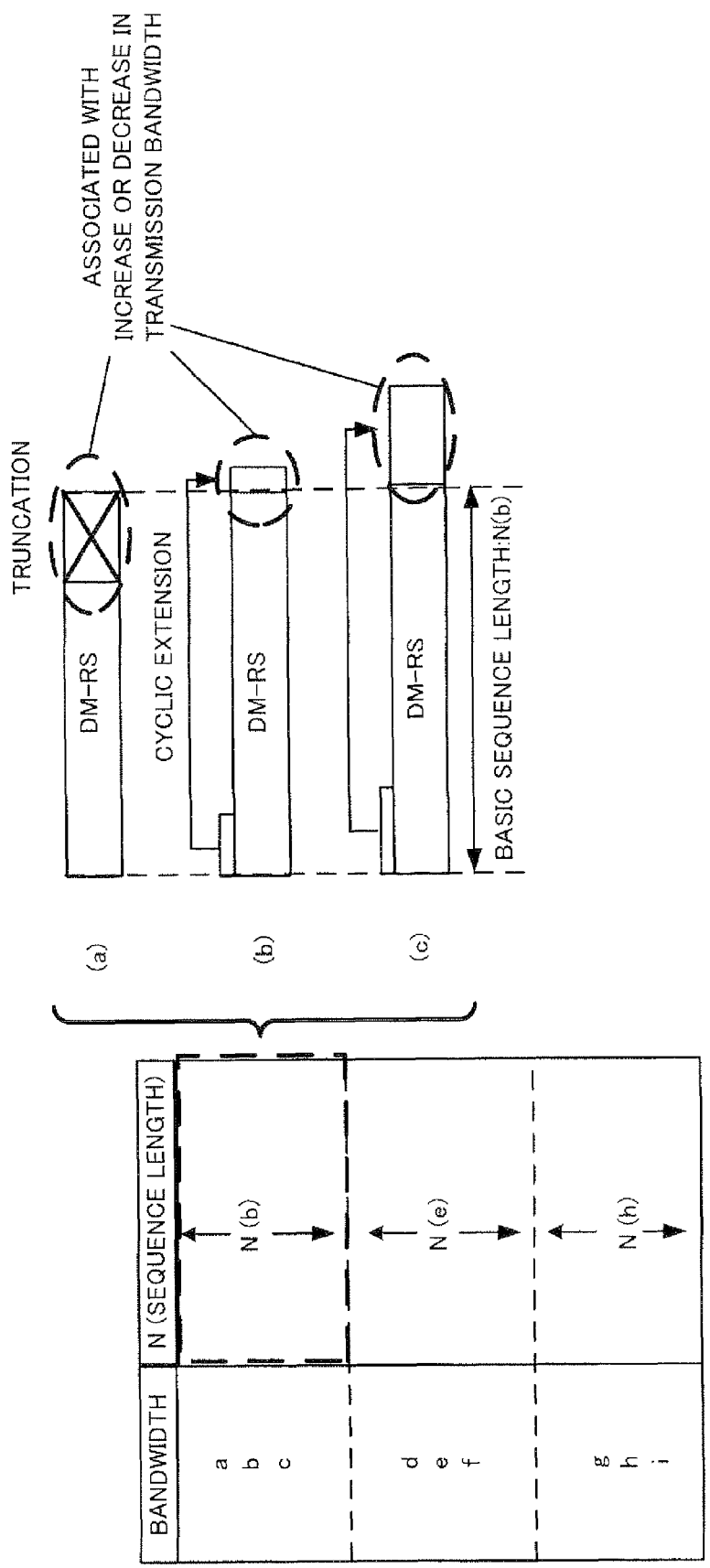
FIG. 7 illustrates a sequence length determining section shown in FIG. 5 and FIG. 6 in detail.

Next, sequence length determining sections 105 and 164 described above will be explained in detail. As shown in FIG. 7, sequence determining sections 105 and 164 hold the association relationships between the transmission bandwidth and the sequence length. According to these association relationships, single basic sequence lengths are set for a plurality of transmission bandwidths, respectively. In the example shown in FIG. 7, a single sequence length N(b) is set between transmission bandwidths "a," "b" and "c." Here, the sequence length N(b) is the maximum prime number less than the number of subcarriers in the transmission bandwidth "b." Similarly, a single sequence length N(e) is set between transmission bandwidths "d," "e" and "f," and a single sequence length N(h) is set between transmission bandwidths "g," "h" and "i." That is, in this case, three transmission bandwidths are grouped, and these groups are associated with respective basic sequence lengths.

Upon acquiring transmission bandwidth information, sequence length determining sections 105 and 164 determine a sequence length associated with the acquired transmission bandwidth information. Here, based on the magnitude relationship between the acquired transmission bandwidth information and the basic sequence length, whether cyclic extension processing or truncation processing is performed on the ZC sequence is identified. That is, it is identified that cyclic extension processing is performed when transmission bandwidth information is longer than the basic sequence length and that truncation processing is performed when transmission bandwidth information is shorter than the basic sequence length. Further, the difference between the transmission bandwidth and the basic sequence length, that is, the number of cyclic extension and truncation symbols, is found. Here, when the transmission bandwidth information corresponds to the basic sequence length, although it is possible to identify to perform cyclic extension processing or perform truncation processing, the number of cyclic extension and truncation symbols is 0.

For example, when acquired transmission bandwidth information indicates the transmission bandwidth "a," sequence length determining sections 105 and 164 determine the sequence length N(b) associated with the transmission bandwidth "a," and find the number of truncation symbols because the transmission bandwidth "a" is shorter than the sequence length N(b). Also, when acquired transmission bandwidth information indicates transmission band "c," sequence length determining sections 105 and 164 determine the sequence length N(b) associated with the transmission bandwidth "c," and find the number of cyclic extension symbols because the transmission bandwidth "c" is longer than the sequence length N(b).

Also, instead of calculating the difference between the transmission bandwidth and the basic sequence length, that is, instead of calculating the number of cyclic extension and truncation symbols in sequence length determining sections 105 and 164, it is equally possible to find a sequence length and the number of cyclic extension and truncation symbols by providing, for example, a table for determining a sequence length and the number of cyclic extension and truncation symbols from transmission bandwidth information.

Also, although the basic sequence length is set with the sequence length of the center bandwidth among a plurality of transmission bandwidths, the present invention is not limited to this, and it is equally possible to set the basic reference length with N(a) or N(c). Also, it is equally possible to set a sequence length other than N(a), N(b) and N(c), with the basic sequence length.

Also, although both cyclic extension and truncation are used for the increase or decrease in the transmission bandwidth, it is equally possible to use only cyclic extension or only truncation. That is, it is possible to set the basic sequence length with the shortest transmission bandwidth among a plurality of transmission bandwidths and apply only cyclic extension. For example, in FIG. 7, N(a) is used as the basic sequence length instead of N(b), and only cyclic extension is used for the increase or decrease in the transmission bandwidth. By contrast, it is possible to set the basic sequence length with the longest transmission bandwidth and apply only truncation. For example, in FIG. 7, N(a) is used as the basic sequence length instead of N(b), and only cyclic extension is used for the increase or decrease in the transmission bandwidth.

Also, although cyclic extension or truncation is used for the increase or decrease in the transmission bandwidth, it is equally possible to use zero padding for allocating "0," instead of cyclic extension. That is, for the subcarriers in the transmission bandwidth, "0" is assigned to subcarriers beyond the sequence length. Here, it is equally possible to use both cyclic extension and zero padding instead of using cyclic extension alone.

Also, although three kinds of transmission bandwidths are generated from a ZC sequence of a single basic sequence length, the present invention is not limited to this, and, for example, it is equally possible to generate five kinds of transmission bandwidths by a ZC sequence of a single basic sequence length. Further, it is not necessary to equally group three kinds or five kinds each. For example, it is possible to provide a range in which three kinds of transmission bandwidths are generated by a ZC sequence of a single basic sequence length and a range in which five kinds of transmission bandwidths are generated by a ZC sequence of a single basic sequence length.

Thus, according to Embodiment 1, by associating a single basic sequence length with a plurality of transmission bandwidths and by performing cyclic extension processing or truncation processing on a ZC sequence based on a designated transmission bandwidth and the basic sequence length associated with this transmission bandwidth, even when RS's are transmitted using different transmission bandwidths between adjacent cells, it is possible to maintain low cross correlation in the basic sequence length part between sequences having the same basic sequence length, so that it is possible to reduce interference given to adjacent cells. Therefore, it is possible to improve the accuracy of channel estimation.

Further, it is possible to reduce the number of different sequence lengths, so that it is possible to reduce the circuit scale of, for example, the memory for storing sequence lengths, and reduce the amount of calculations required for sequence generation. Further, it is possible to reduce information indicating sequence numbers of ZC sequences in addition to sequence length information.

Also, although the CM (Cubic Metric)/PAPR (Peak to Average Power Ratio) characteristic increases significantly by repeating the same ZC sequence several times in the frequency domain, when only part of a ZC sequence is subjected to cyclic extension or truncation, it is possible to maintain the low CM/PAPR characteristic.

Figure 5:
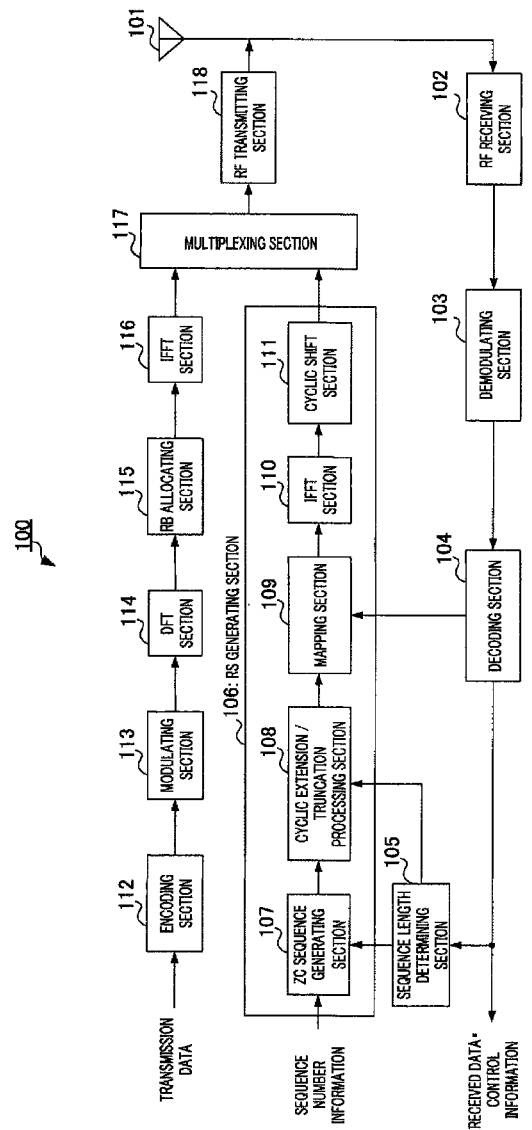
FIG. 5 is a block diagram showing the configuration of a terminal according to Embodiment 1 of the present invention.
Figure 8:
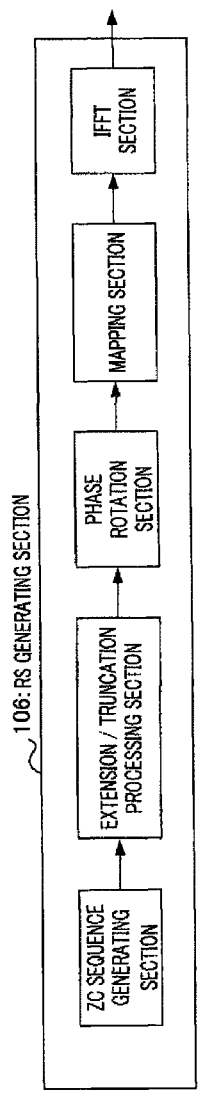
FIG. 8 is a block diagram showing another configuration inside an RS generating section shown in FIG. 5.
Figure 9A:
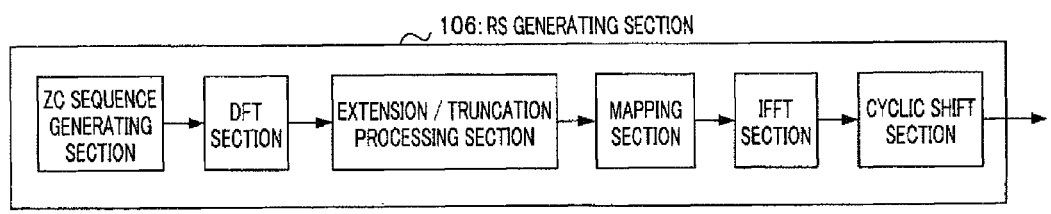
FIG. 9 is a block diagram showing another configuration inside an RS generating section shown in FIG. 5.
Figure 9B:
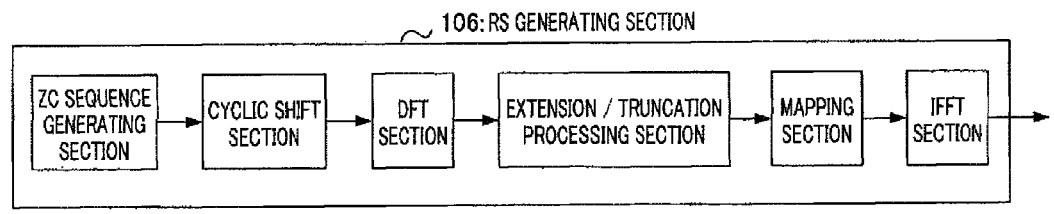
Figure 9C:
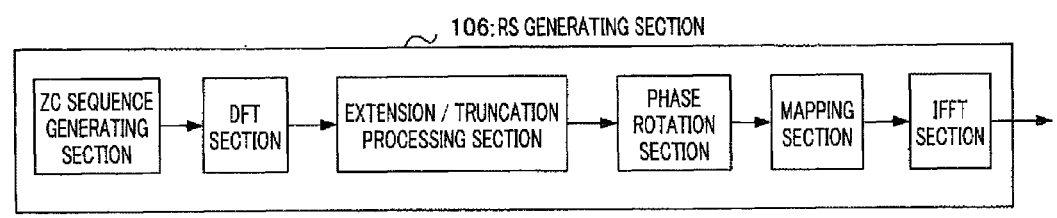

Also, although a case has been described above with the present embodiment where RS generating section 106 in a terminal is as shown in FIG. 5, it is equally possible to employ the configuration shown in FIG. 8. RS generating section 106 shown in FIG. 8 has a phase rotation section after a cyclic extension and truncation processing section. Instead of performing a cyclic shift in the time domain, this phase rotation section performs phase rotation, which is equivalent processing to cyclic shift. Also, although those reference signal generating sections employ a configuration where ZC sequences are generated in the frequency domain, as shown in FIGS. 9A to 9C, it is equally possible to employ a configuration where ZC sequences are generated in the time domain, and, in this case, a DFT section is provided after a ZC sequence generating section or after a cyclic shift section. Here, if a cyclic shift sequence is not used, it is not necessary to provide a cyclic shift section or a phase rotation section.

Also, although a single carrier FDMA (Frequency Division Multiplexing Access) configuration has been described above with the present embodiment, it is equally possible to employ an OFDM (Orthogonal Frequency Division Multiplexing) configuration.

Embodiment 2

A case will be explained with Embodiment 2 of the present invention where, when the transmission bandwidth is longer, the number of transmission bandwidths R increases which can be generated by a ZC sequence of a single basic sequence length (where R is a natural number equal to or greater then 2). Here, when a transmission bandwidth is shorter than a certain value, a ZC sequence is generated using a specific basic sequence length on a per transmission bandwidth basis. When the transmission bandwidth is longer than a certain value, the number of transmission bandwidths that are generated from a ZC sequence of a single basic sequence length, may be R (where R is a natural number equal to or greater than 2).

The configurations of the terminal and base station according to Embodiment 2 of the present invention are the same as the configurations shown in FIG. 5 and FIG. 6 in Embodiment 1, and differ from these configurations only in part of the functions, and different functions will be explained using FIG. 5 and FIG. 6.

Sequence length determining section 105 in a terminal holds relationships associating a single basic sequence length with a smaller number of transmission bandwidths when a transmission bandwidth is shorter and associating a single basic sequence length with a larger number of transmission bandwidths when a transmission bandwidth is longer. Further, sequence length determining section 105 determines the basic sequence length and the number of cyclic extension and truncation symbols of a ZC sequence, based on transmission bandwidth information (about the number of RB's) outputted from decoding section 104. Here, the number of cyclic extension and truncation symbols is calculated from the difference between the transmission bandwidth and the basic sequence length. The determined sequence length of the ZC sequence is outputted to ZC sequence generating section 107, and the number of cyclic extension and truncation symbols is outputted to cyclic extension and truncation processing section 108.

Similar to sequence length determining section 105 in the terminal, sequence length determining section 164 in the base station holds the relationships between the transmission bandwidth and the basic sequence length, and, based on transmission bandwidth information received as input from a scheduler (not shown), determines the number of cyclic extension and truncation symbols. The determined basic sequence length of the ZC sequence is outputted to ZC sequence generating section 165, and the number of cyclic extension and truncation symbols is outputted to cyclic extension and truncation processing section 166.

Figure 10:
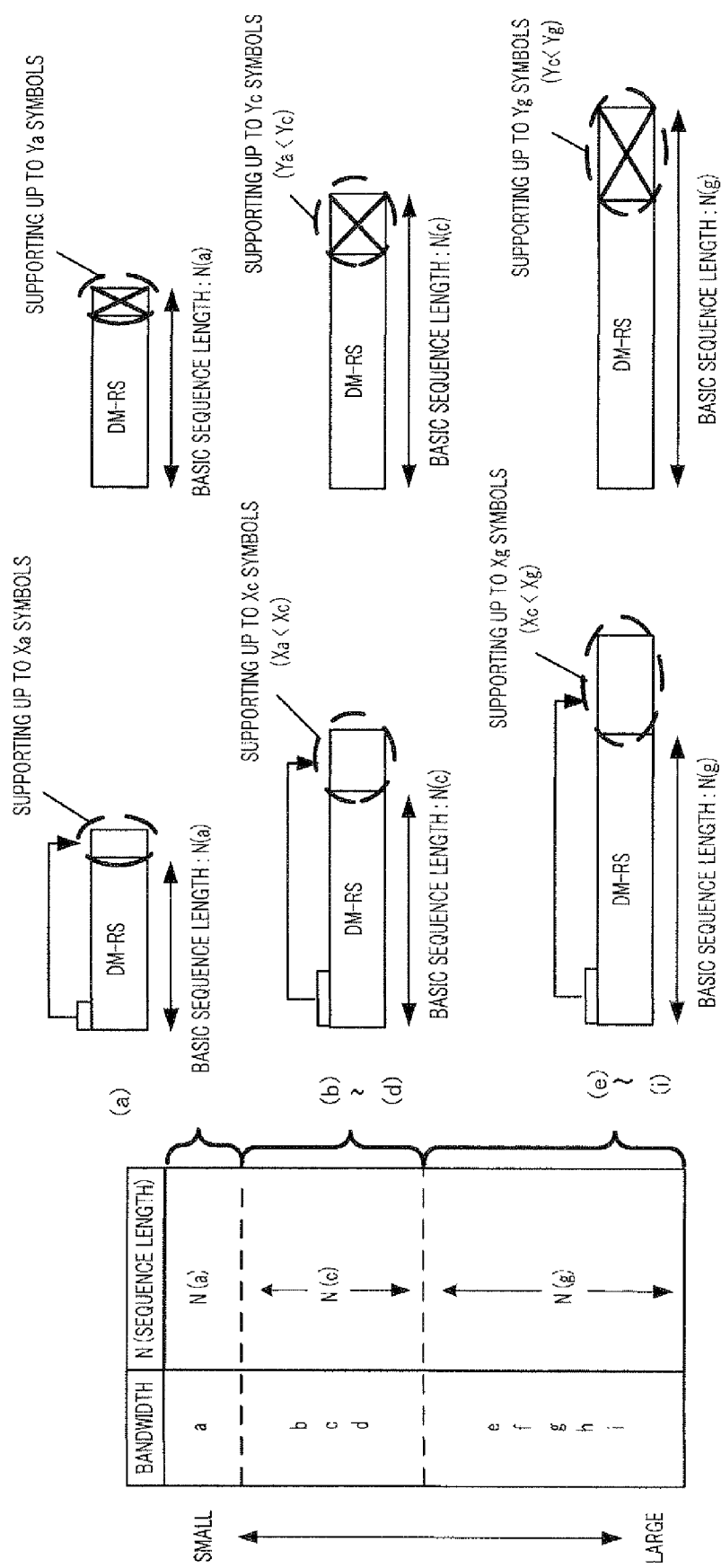
FIG. 10 illustrates a sequence length determining section according to Embodiment 2 of the present invention in detail.

Next, sequence length determining sections 105 and 164 described above will be explained in detail. As shown in FIG. 10, sequence length determining sections 105 and 164 hold the relationship between transmission bandwidth and the basic sequence lengths. According to these relationships, as described above, when a transmission bandwidth is shorter, a single basic sequence length is associated with a smaller number of transmission bandwidths, and, when a transmission bandwidth is longer, a single basic sequence length is associated with a larger number of transmission bandwidths. That is, when a ZC sequence has a longer basic sequence length, a maximum number of symbols that can be subject to cyclic extension or truncation (hereinafter "the possible number of cyclic extension and truncation symbols") increases, and, when a ZC sequence has a shorter basic sequence length, the possible number of cyclic extension and truncation symbols decreases.

Here, assume that basic sequence lengths used in the system are $N(a)$, $N(c)$ and $N(g)$ ($N(a)<N(c)<N(g)$), and that the maximum possible numbers of cyclic extension symbols associated with the basic sequence lengths $N(a)$, $N(c)$ and $N(g)$ are $Xa$, $Xc$ and $Xg$, respectively. In this case, $Xa$, $Xc$ and $Xg$ satisfy the relationship $Xa<Xc<Xg$. That is, the possible number of cyclic extension symbols ($Xa$, $Xc$ or $Xg$) varies depending on the transmission bandwidth. For example, when the transmission bandwidth is 1 RB, $Xa$ is set because the possible number of cyclic extension symbols is small, and, when the transmission bandwidth is 3 RB's, the possible number of cyclic extension symbols is $Xc$, which is greater than $Xa$.

Also, the maximum possible numbers of truncation symbols associated with basic sequence lengths $N(a)$, $N(c)$ and $N(g)$ are up to $Ya$, $Yc$ and $Yg$, respectively. In this case, $Ya$, $Yc$ and $Yg$ satisfy the relationship $Ya<Yc<Yg$. That is, the possible number of truncation symbols ($Ya$, $Ye$ and $Yg$) varies depending on a transmission bandwidth.

Also, in FIG. 10, although transmission bandwidths are divided into three groups (a, b to d, and e to i) the present invention is not limited to this, and it is equally possible to divide them into two groups, four groups or more. Also, although one kind of transmission bandwidth (only "a"), three kinds of transmission bandwidths (only "b" to "d") or five kinds of transmission bandwidths ("e" to "i") are generated from a single basic sequence length, the present invention is not limited to this. Also, it is equally possible to provide a threshold for transmission bandwidths, and, when the transmission bandwidth is less than the threshold, generate a ZC sequence by a specific basic sequence length per transmission bandwidth, or, when the transmission bandwidth is equal to or greater than the threshold, generate ZC sequences of a plurality of transmission bandwidths from a single basic sequence length.

Also, although a case has been described above where the possible number of cyclic extension and truncation symbols varies depending on the transmission bandwidth, the present invention is not limited to this, and it is equally possible to change the possible number of cyclic extension and truncation symbols depending on, for example, the basic sequence length or the number of RB's associated with the transmission bandwidth.

Also, the possible number of cyclic extension and truncation symbols may be partly the same between basic sequence lengths. That is, $Xa \leq Xc \leq Xg$ and $Ya \leq Yc \leq Yg$ are both possible.

Thus, according to the present embodiment, by associating a single basic transmission length with a smaller number of transmission bandwidths when the transmission bandwidth is shorter and by associating a single basic sequence length with a larger number of transmission bandwidths when the transmission bandwidth is longer, it is possible to reduce the proportion of other parts than the basic sequence length part to the basic sequence length part in a ZC sequence of a long sequence length even when the possible number of cyclic extension and truncation symbols increases, so that it is possible to maintain the low cross correlation characteristics and low CM/PAPR characteristics.

Also, the circuit scale and the amount of calculations required increase when a ZC sequence has a longer sequence length, so that it is possible to further reduce the circuit scale and the amount of calculations. Also, it is possible to reduce information indicating sequence numbers of ZC sequences in addition to sequence length information.

Embodiment 3

The configurations of the terminal and the base station according to Embodiment 3 of the present invention are the same as the configurations shown in FIG. 5 and FIG. 6, and differ from these configurations only in part of the functions, and different functions will be explained using FIG. 5 and FIG. 6.

Sequence length determining section 105 in the terminal holds the relationships associating a single basic sequence length with a smaller number of transmission bandwidths when the transmission bandwidth is shorter and associating a single basic sequence length with a larger number of transmission bandwidths when the transmission bandwidth is longer. Further, sequence determining section 105 determines the basic sequence length of a ZC sequence based on transmission bandwidth information (about the number of RB's) outputted from decoding section 104, and determines the number of cyclic extension and truncation symbols from the determined basic sequence length and the transmission bandwidth of an RS reported from the base station. In this case, assume that the number of cyclic extension and truncation symbols is less than the possible number of cyclic extension and truncation symbols defined such that the proportion of the basic sequence length is fixed in each transmission bandwidth. Further, the determined basic sequence length of the ZC sequence is outputted to ZC sequence generating section 107, and the number of cyclic extension and truncation symbols is outputted to cyclic extension and truncation processing section 108.

Similar to sequence length determining section 105 in terminal 100, sequence length determining section 164 in the base station holds the relationship between the transmission bandwidth and the basic sequence lengths, determines the basic sequence length of a ZC sequence based on transmission bandwidth information received as input from a scheduler (not shown), and determines the number of cyclic extension and truncation symbols from the determined basic sequence length and the transmission bandwidth of an RS. In this case, assume that the number of cyclic extension and truncation symbols is less than the possible number of cyclic extension and truncation symbols defined such that the proportion of the basic sequence length is fixed. Further, the determined basic sequence length of the ZC sequence is outputted to ZC sequence generating section 165, and the number of cyclic extension and truncation symbols is outputted to cyclic extension and truncation processing section 166.

Next, sequence length determining sections 105 and 164 described above will be explained in detail. As shown in FIG. 11, sequence length determining sections 105 and 164 hold the relationships between the transmission bandwidth and the basic sequence length. As described in Embodiment 2, according to these relationships, the basic sequence length is associated with a smaller number of transmission bandwidths when a transmission bandwidth is shorter, and the basic sequence length is associated with a larger number of transmission bandwidths when a transmission bandwidth is longer. Further, sequence length determining sections 105 and 164 determine the number of cyclic extension and truncation symbols from the above relationships between the transmission bandwidth and the basic sequence length.

For example, as shown in FIG. 11, "the number of cyclic extension and truncation symbols/basic sequence length $N(x)$" is equalized between transmission bandwidths. That is, when the basic sequence lengths are $N(a)$, $N(c)$ and $N(g)$ and the possible number of cyclic extension symbols are Xa, Xc and Xg, Xa, Xc and Xg are selected such that $Xa/N(a)$, $Xc/N(c)$ and $Xg/N(g)$ are the same. Also, when the possible number of truncation symbols are Ya, Yc and Yg, Ya, Yc and Yg are selected such that $Ya/N(a)$, $Yc/N(c)$ and $Yg/N(g)$ are the same.

Also, $Xa/N(a)$, $Xc/N(c)$ and $Xg/N(g)$, or $Ya/N(a)$, $Yc/N(c)$ and $Yg/N(g)$ need not be match exactly, and can apply approximate values. For example, if the possible number of cyclic extension and truncation symbols determined by $Xa/N(a)$, $Xc/N(c)$ and $Xg/N(g)$, or by $Ya/N(a)$, $Yc/N(c)$ and $Yg/N(g)$, is not an integer, it is possible to use floor($Xa/N(a)$), ceil($Xa/N(a)$), round($Xa/N(a)$), and so on. Here, "floor( )" means rounding up the fraction part of the value in the parenthesis, "ceil( )" means rounding down the fraction part of the value in the parenthesis, and "round( )" means rounding the fraction part of the value in the parenthesis, where the values in these parentheses are integers.

Also, although a case has been described above where the possible number of cyclic extension and truncation symbols varies depending on the basic sequence length, the present invention is not limited to this, and it is equally possible to change the possible number of cyclic extension and truncation symbols depending on, for example, the transmission bandwidth or the number of transmission RB's associated with the basic sequence length. That is, it is equally possible to make equal the possible number of cyclic extension and truncation symbols to the transmission bandwidth (i.e. the number of RB's).

Thus, according to Embodiment 3, by determining the possible number of cyclic extension and truncation symbols to make equal the proportion between the possible number of cyclic extension and truncation symbols and the basic sequence length $N(x)$ in each transmission bandwidth, it is possible to suppress the cross correlation characteristics and CM/PAPR characteristics between sequences to a certain level, regardless of the transmission bandwidth. Also, by simple calculations, it is possible to acquire the basic sequence length and the possible number of cyclic extension and truncation symbols from given transmission bandwidth information.

Embodiment 4

Although cases have been described above with Embodiments 1 to 3 where a DM-RS is used as an RS, an example case will be explained using an SRS with Embodiment 4 of the present invention. Specifically, an STS subject to distributed FDM transmission will be explained. However, the configurations of the terminal and the base station according to Embodiment 4 of the present invention are the same as the configurations shown in FIG. 5 and FIG. 6 in Embodiment 1, and differ from these configurations only in part of the functions, and different functions will be explained using FIG. 5 and FIG. 6.

Here, distributed FDM is the transmitting method of allocating a ZC sequence at regular subcarrier intervals. Here, regular subcarrier intervals are determined by RPF (RePetition Factor), and, when RPF=N, a ZC sequence is allocated at N subcarrier intervals. For example, with distributed FDM of RPF=2, the subcarrier interval to transmit a ZC sequence is 2, and, consequently, a ZC sequence is transmitted in odd-number subcarriers #1, #3, #5, and so on, or in even-number subcarriers #0, #2, #4, and so on.

Even in distributed FDM, a plurality of ZC sequences of transmission bandwidths are generated from a single basic sequence length. Also, in distributed FDM transmission, a ZC sequence of the basic sequence length is allocated at regular subcarrier intervals (RPF=N). In this case, sequence length determining sections 105 and 164 identify to perform cyclic extension if "the bandwidth in which a ZC sequence is allocated by distributed FDM is greater than the transmission bandwidth," or identify to perform truncation if "the bandwidth in which a ZC sequence is allocated by distributed FDM is less than the transmission bandwidth," to match the transmission bandwidth. That is, depending on the increase or decrease in the transmission bandwidth, the number of cyclic extension and truncation symbols is determined.

Figure 12:
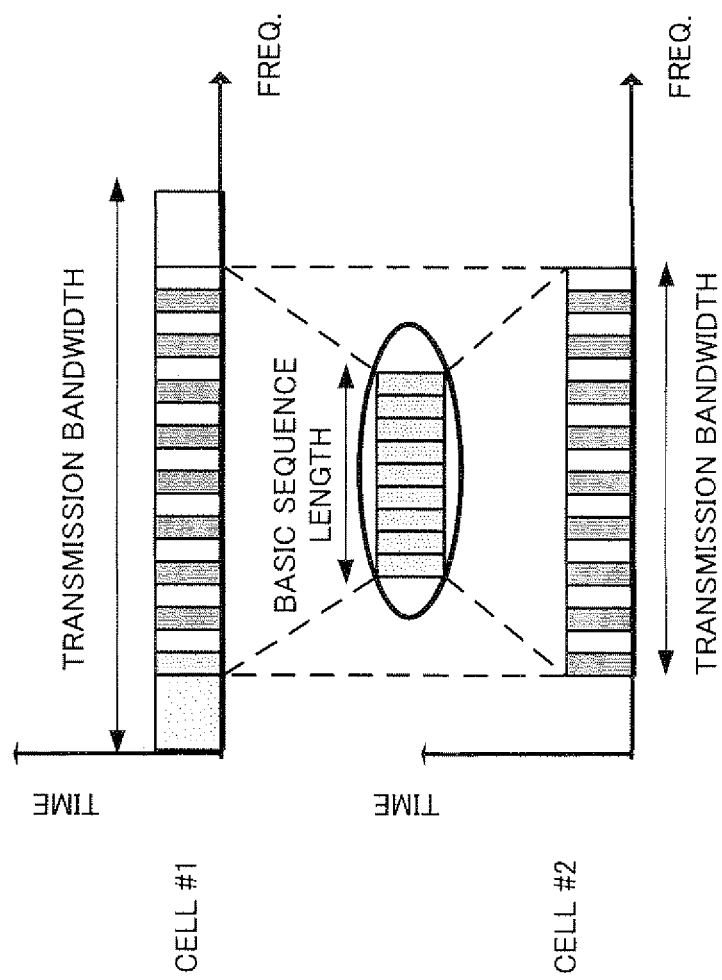
FIG. 12 illustrates a state where a ZC sequence is allocated to an SRS subject to distributed FDM transmission.

In FIG. 12, RPF=2 is assumed, a ZC sequence is allocated at two-subcarrier intervals, and a ZC sequence of the same basic sequence length is used in cell #1 and cell #2. In this case, cyclic extension is performed in cell #1 because the bandwidth in which the ZC sequence is allocated is shorter than the transmission bandwidth, and neither cyclic extension nor truncation is not performed in cell #2 because the bandwidth in which the ZC sequence is allocated is equal to the transmission bandwidth.

Here, if SRS transmission bandwidths of 1.25 MHz and 5 MHz are subject to distributed FDM multiplexing, a ZC sequence of the basic sequence length for 1.25 MHz is used in the SRS transmission bandwidth near 1.25 MHz, and a ZC sequence of the basic sequence length for 5 MHz is used in the SRS transmission bandwidth near 5 MHz.

Also, it is possible to apply a DM-RS or other RS's than an SRS, as an RS applied to distributed FDM transmission.

Thus, according to Embodiment 4, even when adjacent cells use different SRS transmission bandwidths (i.e. the numbers of RB's), by using a ZC sequence of the same sequence length between adjacent cells, it is possible to reduce inter-symbol interference between bandwidths, reduce the circuit scale of, for example, a memory for storing sequences, and reduce the amount of calculations required for sequence generation.

Embodiment 5

A case will be explained with Embodiment 5 of the present invention where the SRS transmission bandwidth is increased or decreased depending on the increase or decrease in the transmission bandwidth of the PUCCH (Physical Uplink Control Channel).

Figure 13A:
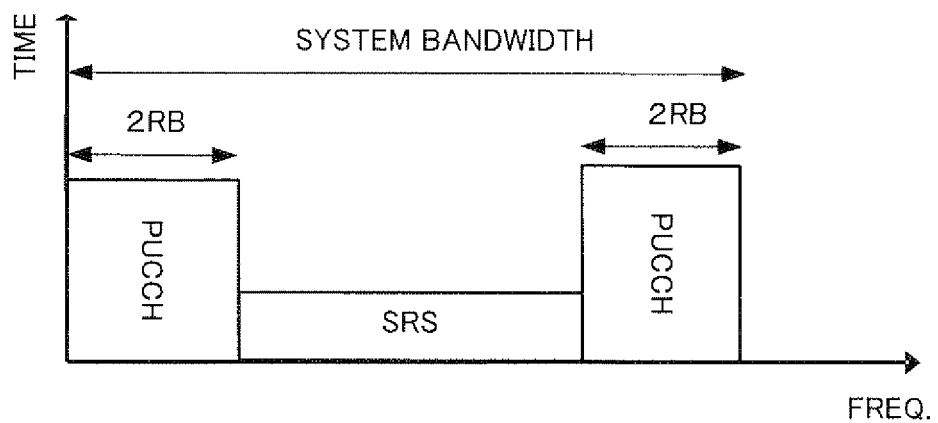
FIG. 13 illustrates a state where a PUCCH is subjected to FDM multiplexing at both ends of a system band.
Figure 13B:
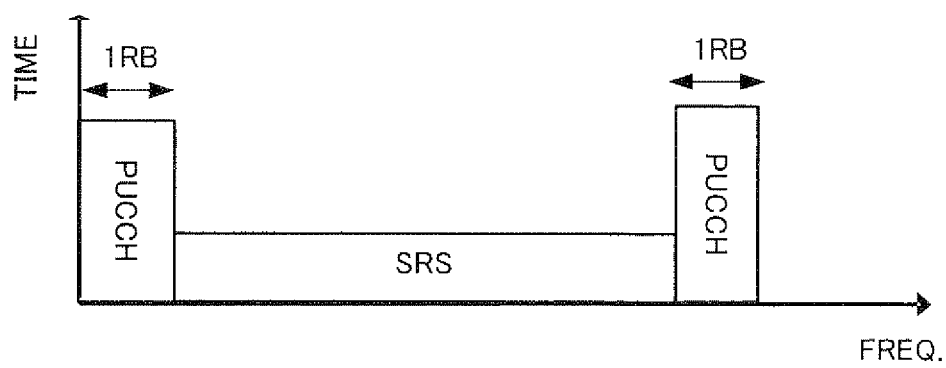

In Non-Patent Document 1 described above, as shown in FIG. 13, studies are underway to FDM-multiplex PUCCH's with both ends of the system bandwidth. Here, a PUCCH is a channel by which a terminal that does not perform data transmission transmits control information, and the transmission bandwidth of a PUCCH is increased or decreased depending on the amount of control information. For example, FIG. 13A illustrates a state where PUCCH's of 2 RB's are allocated to both ends of the system band, and FIG. 13B illustrates a state where PUCCH's of 1 RB are allocated to both ends of the system band.

On the other hand, studies are underway to transmit an SRS in the transmission band not including the PUCCH's. In this case, the SRS transmission bandwidth is increased or decreased depending on the increase or decrease in PUCCH's, and, if PUCCH bandwidths are different between cells, ZC sequences of different sequence lengths may be transmitted between cells.

The configurations of the terminals and the base station according to Embodiment 5 of the present invention are the same as the configurations shown in FIG. 5 and FIG. 6 in Embodiment 1, and differ from these configurations only in part of the functions, and different functions will be explained.

The ZC sequence to transmit in an SRS transmission bandwidth produced by the increase or decrease in the PUCCH transmission bandwidth, is generated by adjusting the number of cyclic extension and truncation symbols. That is, SRS transmission bandwidths varying from the (minimum) SRS transmission bandwidth in the case of the maximum PUCCH transmission bandwidth to the (maximum) SRS transmission bandwidth in the case of the minimum PUCCH transmission bandwidth, are generated from a ZC sequence of a single basic sequence length.

Figure 14:
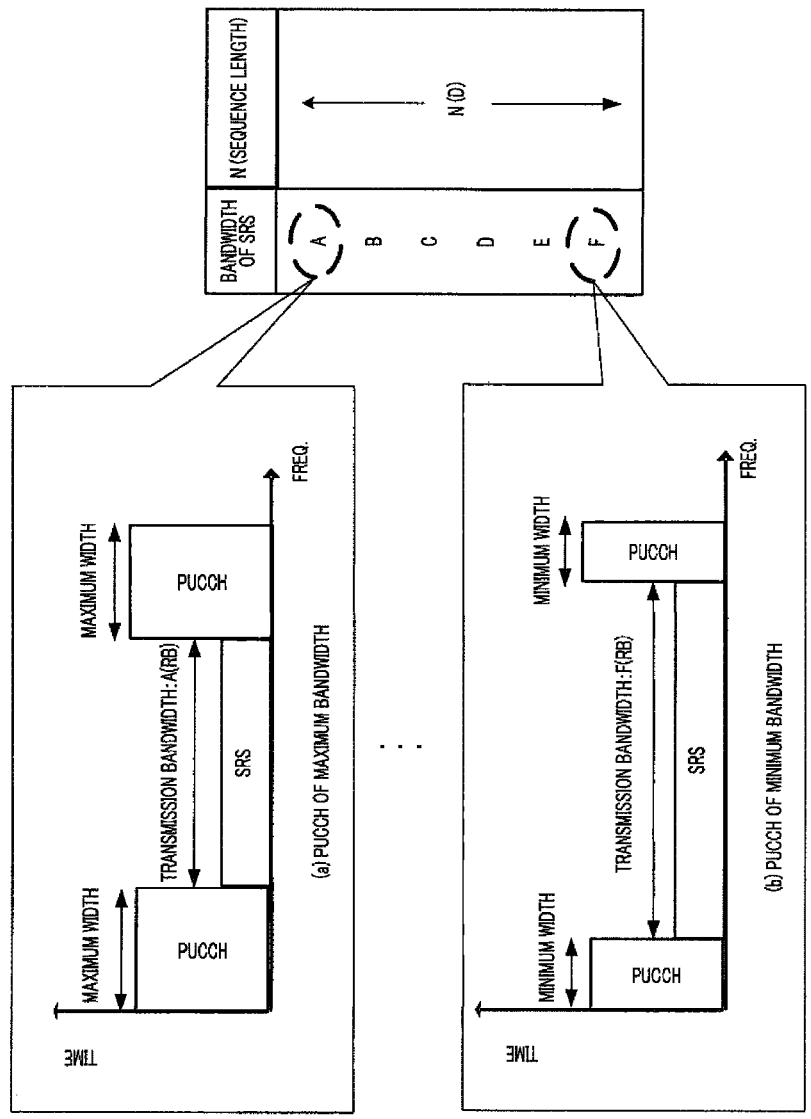
FIG. 14 illustrates a state where an SRS transmission bandwidth varies depending on the increase or decrease in the transmission bandwidth of a PUCCH.

For example, in FIG. 14, if the (minimum) SRS transmission bandwidth in the case of the maximum PUCCH transmission bandwidth is referred to as "A" (RB) and the (maximum) SRS transmission bandwidth in the case of the minimum PUCCH transmission bandwidth is referred to as "F" (RB), A (RB) to F (RB) are generated from a ZC sequence of a single basic sequence length N(D). Also, sequence length determining sections 105 and 164 identify to perform cyclic extension when the basic sequence length is less than the SRS transmission bandwidth, and identify to perform truncation when the basic sequence length is greater than the SRS transmission bandwidth, such that the ZC sequence matches the SRS transmission bandwidth.

Thus, according to Embodiment 5, even when the SRS transmission bandwidth is increased or decreased depending on the increase or decrease in PUCCH's, by adjusting the number of cyclic extension and truncation symbols, it is possible to reduce interference given to adjacent cells, reduce the circuit scale of, for example, a memory for storing sequence lengths, and reduce the mount of calculations required for sequence generation.

Figure 15:
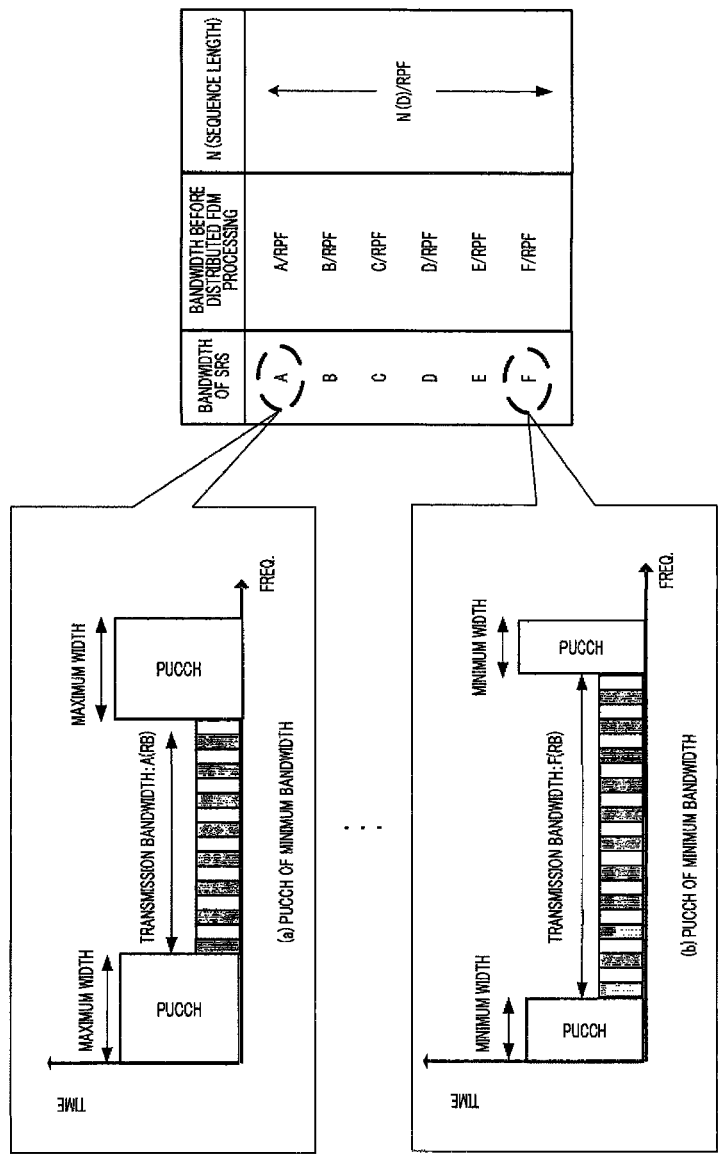
FIG. 15 illustrates a state where distributed FDM transmission is performed using a variable SRS transmission bandwidth.

Also, it is possible to further reduce the number of transmission bandwidths generated from the ZC sequence of a single basic sequence length. For example, using a transmission bandwidth greater than A (RB), which is the minimum SRS transmission bandwidth, as B (RB), and a transmission bandwidth less than F (RB), which is the maximum SRS transmission bandwidth, as E (RB), it is possible to generate B (RB) to E (RB) from a ZC sequence of a single basic sequence length. Also, when an SRS transmission bandwidth is increased or decreased depending on the increase or decrease in the PUCCH transmission bandwidth, as shown in FIG. 15, a combination with distributed FDM transmission described in Embodiment 4 is equally possible. For example, upon generating A (RB) to F (RB) from a ZC sequence of a single basic sequence length, it is preferable to use a sequence length before distributed FDM processing, that is, one of N(A)/RPF to N(F)/RPF, as the basic sequence length. Also, in FIG. 15, N(D)/RPF is the basic sequence length. Also, in this case, sequence length determining sections 105 and 164 identify to perform cyclic extension when the bandwidth in which a ZC sequence is allocated by distributed FDM is less than the SRS transmission bandwidth, and identify to perform truncation when the bandwidth in which the ZC sequence is allocated by distributed FDM is greater than the SRS transmission bandwidth, such that the ZC sequence matches the SRS transmission bandwidth.

Also, although an uplink DM-RS has been described above as an example with Embodiments 1 to 3, for example, an SRS, downlink RS and pilot signal for synchronization are equally applicable. In this case, it is necessary to generate CAZAC sequences of a plurality of transmission bandwidths (i.e. the numbers of RB's) from a single basic sequence length, and change the number of cyclic extension and truncation symbols for a CAZAC sequence of the basic sequence length, depending on the increase or decrease in the transmission bandwidth (i.e. the number of RB's). Similarly, although an uplink SRS has been described above as an example with Embodiments 4 and 5, a DM-RS, downlink RS and pilot signal for synchronization are equally applicable.

Figure 16:
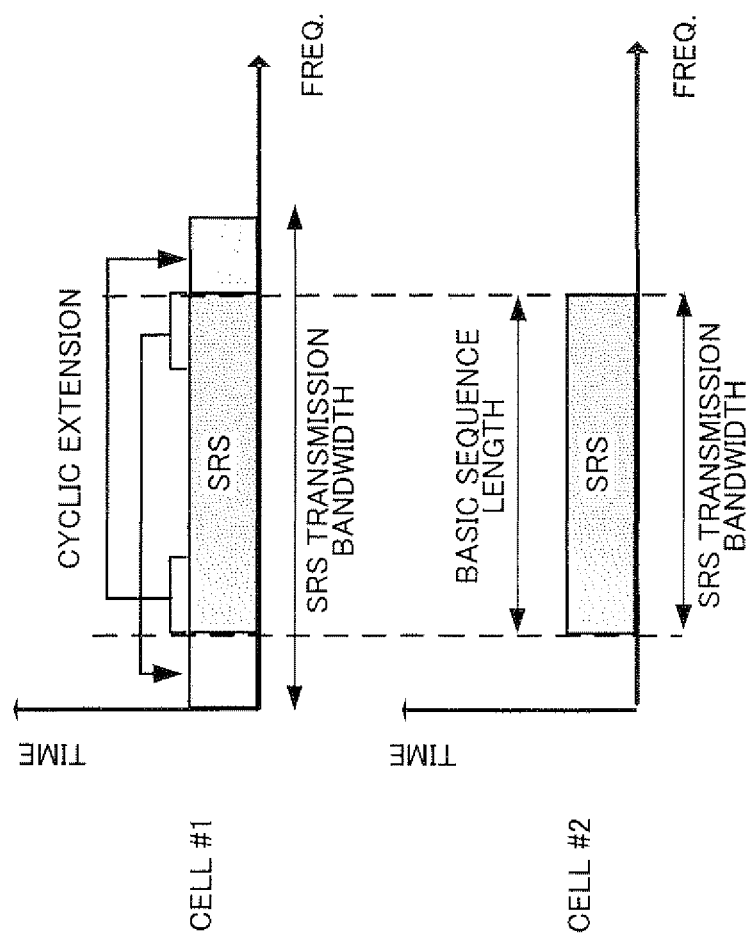
FIG. 16 shows a position in which cyclic extension or truncation is performed.
Figure 17:
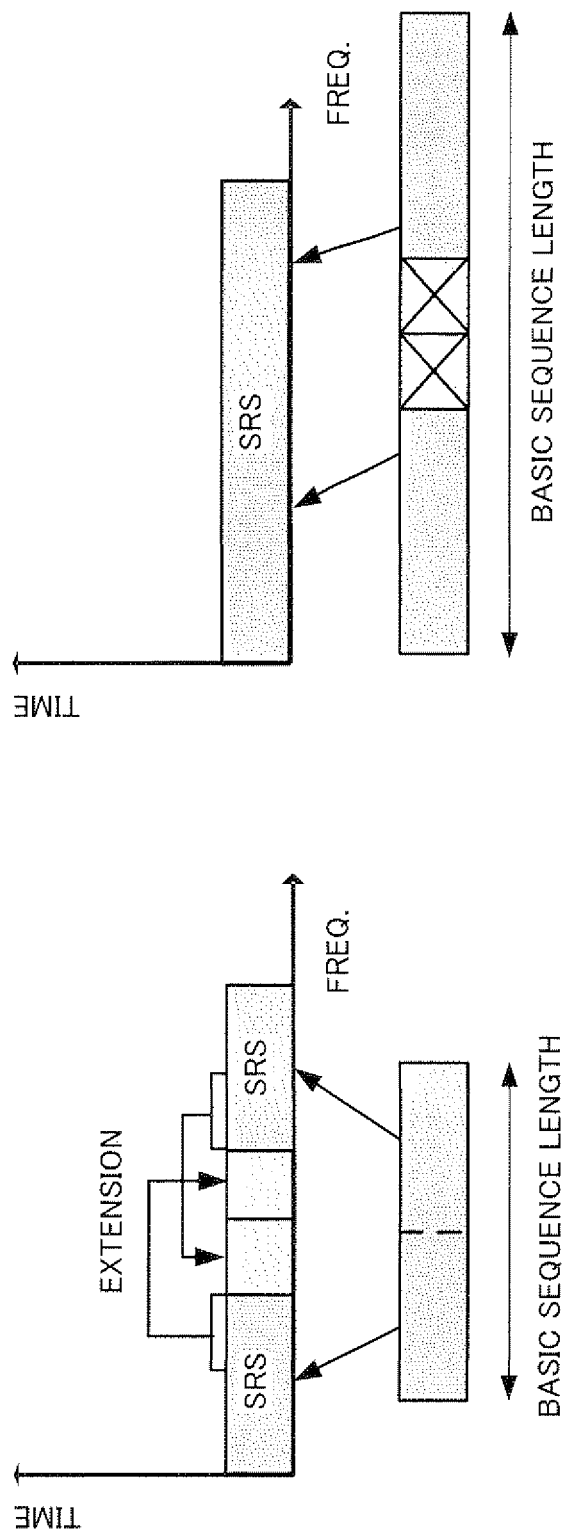
FIG. 17 shows a position in which cyclic extension or truncation is performed.

Also, as a position in which cyclic extension or truncation is performed, it is possible to set both ends of a ZC sequence as shown in FIG. 16, or set only one end of a ZC sequence as shown in FIG. 7. Also, as a position in which cyclic extension or truncation is performed, it is possible to set the central part of a ZC sequence as shown in FIG. 17.

Embodiment 6

A case will be explained with Embodiment 6 of the present invention where the relationships between the sequence length (basic sequence length), the transmission bandwidth (the number of RB's) and the number of cyclic extension and truncation symbols, vary per RPF (RePetition Factor).

The configurations of the terminal and the base station according to Embodiment 6 of the present invention are the same as the configurations shown in FIG. 5 and FIG. 6 in Embodiment 1, and differ from these configurations only in part of the functions, and different functions will be explained using FIG. 5 and FIG. 6.

Control information extracted in decoding section 104 in the terminal includes RPF information in addition to transmission bandwidth information (about the number of RB's), and the extracted control information is outputted to sequence length determining section 105.

Using transmission bandwidth (i.e. the number of RB's) information and RPF information outputted from decoding section 104, sequence length determining section 105 in the terminal determines the basic sequence length and the number of cyclic extension and truncation symbols, based on a table showing the relationships between the basic sequence length, the transmission bandwidth (the number of RB's) and the number of cyclic extension and truncation symbols, which vary depending on an RPF. Sequence length determining section 105 outputs sequence information to ZC sequence generating section 107 and outputs the number of cyclic extension and truncation symbols to cyclic extension and truncation processing section 108.

Similar to sequence length determining section 105 in the terminal, sequence length determining section 164 in the base station holds a table showing the relationships between the basic sequence length, the transmission bandwidth (the number of RB's) and the number of cyclic extension and truncation symbols, which vary depending on an RPF, and determines the basic sequence length of a ZC sequence and the number of cyclic extension and truncation symbols. Sequence length determining section 164 outputs the sequence length information to ZC sequence generating section 165 and the number of cyclic extension and truncation symbols to cyclic extension and truncation processing section 166.

Figure 18:
FIG. 18 shows the relationships between the transmission bandwidth (the number of RB's), the number of transmission subcarriers and the sequence length.

Next, the tables provided in sequence length determining section 105 in the terminal and sequence length determining section 164 in the base station, will be explained. Here, to reduce the number of sequence lengths (N) of ZC sequences to store in the base station and the terminal, as shown in FIG. 18, a sequence length (N) of a ZC sequence is provided every 12 subcarriers (1 RB).

In this condition, sequence length determining sections 105 and 164 provide a table showing the relationships between the basic sequence length, the transmission bandwidth (the number of RB's) and the number of cyclic extension and truncation symbols, which vary per RPF. In this case, a sequence length associated with the number of RB's of the integer close to (transmission bandwidth (RB)/RPF), is set as the basic sequence length, and cyclic extension or truncation is performed for the ZC sequence of the basic sequence length to match the transmission bandwidth. Here, it is preferable to set a sequence length associated with the number of RB's of the integer closest to (transmission bandwidth (RB)/RPF), as the basic sequence length. Also, it is possible to set a sequence length associated with the number of RB's of the integer closest to (transmission bandwidth (RB)/RPF), as the basic sequence length, in a range in which the transmission bandwidth is narrow, and set a sequence length associated with the number of RB's of the integer close to (transmission bandwidth (RB)/RPF), as the basic sequence length, in a range in which the transmission bandwidth is wide.

Methods of finding the number of RB's of the integer closest to (transmission bandwidth (RB)/RPF), include the following method. That is, for example, floor(transmission bandwidth (RB)/RPF), ceil(transmission bandwidth (RB)/RPF) and round(transmission bandwidth (RB)/RPF) are possible. Here, these are examples, and it is possible to use only one of these or use two or three of these, depending on the number of RB's. For example, it is possible to use only floor(transmission bandwidth (RB)/RPF), use only ceil (transmission bandwidth (RB)/RPF) or use both methods depending on the number of RB's.

Also, the above methods of "performing cyclic extension or truncation of a ZC sequence of the basic sequence length to match a transmission bandwidth," include the following methods. That is, if the bandwidth in which a ZC sequence of the basic sequence length is allocated by distributed FDM is greater than the transmission bandwidth, truncation is performed to match the transmission bandwidth (the number of RB's). By contrast, if the bandwidth in which a ZC sequence of the basic sequence length is allocated by distributed FDM is less than the transmission bandwidth, cyclic extension is performed to match the transmission bandwidth (the number of RB's).

Here, a case will be explained in detail using FIG. 19, where a sequence length associated with the number of RB's of the integer closest to (transmission bandwidth (RB)/RPF), is set as the basic sequence length using floor(transmission bandwidth (RB)/RPF). In a ZC sequence of the basic sequence length of 23, although the ZC sequence is associated with the number of subcarriers 24 (i.e. transmission bandwidth of 2 RB's) upon RPF=1, the ZC sequence is associated with the numbers of subcarriers 24 (i.e. transmission bandwidth of 4 RB's) and 30 (i.e. transmission bandwidth of 5 RB's). Further, in the ZC sequence of the basic sequence length of 23, although the possible number of cyclic extension and truncation symbols is only (+1) upon RPF=1, the possible number of cyclic extension and truncation symbols is one of (+1) to (+7) upon RPF=2. Thus, the relationships between the basic sequence length, the transmission bandwidth (the number of RB's) and the number of cyclic extension and truncation symbols, vary per RPF. Here, for ease of explanation, although the table shown in FIG. 19 has been explained in detail as an example, the present invention is not limited to this, and, equations and other methods are equally possible as long as these provide the relationships between the basic sequence length, the transmission bandwidth (the number of RB's) and the number of cyclic extension and truncation symbols, which vary per RPF.

Figure 20B:
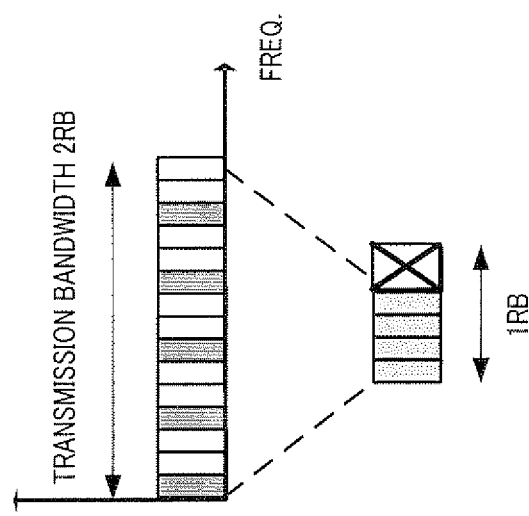
FIG. 20 illustrates a state where a ZC sequence of the basic sequence length is transmitted by distributed FDM of RPF=3.
Figure 20A:
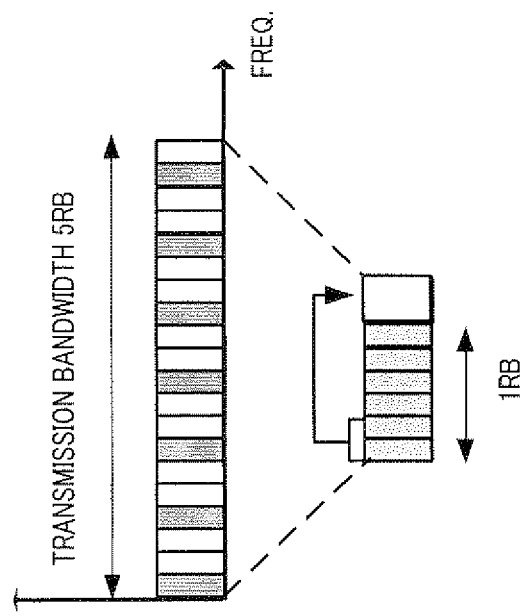

Also, FIG. 20 shows a specific example of transmission by distributed FDM of RPF=3 in transmission bandwidths of 2 RB's and 5 RB's. FIG. 20A illustrates a state where a ZC sequence of the basic sequence length of 11 (i.e. a sequence length of 1 RB) is generated upon a transmission bandwidth of 2 RB's, and, if this ZC sequence is allocated by distributed FDM, the result is greater than the transmission bandwidth, and, consequently, the tail part of the ZC sequence is removed to match the number of subcarriers in the transmission bandwidth, and the resulting sequence is allocated. On the other hand, FIG. 20B illustrates a state where a ZC sequence of the basic sequence length of 11 (i.e. a sequence length of 1 RB) is generated upon a transmission bandwidth of 5 RB's, and, if this ZC sequence is allocated by distributed FDM, the result is less than the transmission bandwidth, and, consequently, the head part of the ZC sequence is repeated to match the number of subcarriers in the transmission bandwidth, and the resulting sequence is allocated.

Thus, according to Embodiment 6, upon changing the relationships between the basic sequence length, the transmission bandwidth (the number of RB's), the number of cyclic extension and truncation symbols on a per RPF basis, by setting a sequence length associated with the number of RB's of the integer close to (transmission bandwidth (RB)/RPF), as the basic sequence length, and by performing cyclic extension or truncation of a ZC sequence of the basic sequence length to match the transmission bandwidth, it is possible to select the basic sequence length suitable to the transmission bandwidth on a per RPF basis, and match a reference signal to a transmission bandwidth and transmit the resulting signal. Also, even in the case of RPF>1, it is possible to maintain low cross correlation between sequences having the same basic sequence length and RPF, and improve an alleviation effect of interference waves.

Also, if there are a plurality of the numbers (e.g. two) of RB's of integers closest to (transmission bandwidth (RB)/RPF), it is possible to set a sequence length having a smaller number of cyclic extension and truncation symbols among the sequence lengths associated with the numbers of RB's, as the basic sequence length.

Also, to match the number of subcarriers in the transmission bandwidth (the number of RB's), it is possible to apply both cyclic extension and truncation or apply only one of cyclic extension and truncation. That is, although ZC sequences of a plurality of bandwidths are generated from a single basic sequence length, it is possible to apply only cyclic extension using the sequence length of the shortest transmission bandwidth (i.e. the number of RB's) as the basic sequence length among the plurality of bandwidths, or apply only truncation using the sequence length of the longest transmission bandwidth (i.e. a largest number of RB's) as the basic sequence length.

Also, the relationship between REF and the possible number of cyclic extension and truncation symbols may be rephrased "the possible number of cyclic extension and truncation symbols increases according to an increased RPF."

Further, the number of subcarriers and basic sequence length that are actually used, may be associated with each other. That is, instead of setting a sequence length associated with the number of RB's of the integer closest to (transmission bandwidth (RB)/RPF) as the basic sequence length, it is possible to set the sequence length closest to (the number of subcarriers/RPF) among sequence lengths available for RPF=1 as the basic sequence length.

Here, it is preferable to set the sequence length closest to (the number of subcarriers/RPF) among sequence lengths available for RPF=1 as the basic sequence length. By this means, it is possible to minimize the number of symbols subject to cyclic extension or truncation to match a transmission bandwidth. To be more specific, when distributed FDM transmission is performed with 60 transmission subcarriers (i.e. 5 RB's) and RPF=2, the sequence length closest to 30 (=60/2) is set as the basic sequence length among sequence lengths available for RPF=1 (in FIG. 19, 11, 23, 31, and so on). That is, it follows that a ZC sequence of the basic sequence length of 31 is generated and only one symbol in the ZC sequence of the basic sequence length is subject to extension.

Embodiment 7

A case will be explained with Embodiment 7 of the present invention where a sequence length associated with the number of RB's close to (transmission bandwidth (RB)/RPF) among the numbers of RB's applicable to DM-RS, is set as the basic sequence length.

In Non-Patent Document 3, studies are underway to use localized FDM, which is used to transmit a ZC sequence by consecutive subcarriers to a demodulation reference signal (DM-RS) for PUSCH (Physical Uplink Shared Channel), and provide a sequence length (N) per RB in which a data transmission bandwidth is present. Here, as shown in FIG. 21, the number of RB's in which a data transmission bandwidth is present, is represented by multiples of 2, 3 and 5. For example, upon applying cyclic extension, a sequence length is 11 in a bandwidth of 1 RB (i.e. 12 subcarriers), 12 in a bandwidth of 2 RB's (i.e. 24 subcarriers) or 31 in a bandwidth of 3 RB's (i.e. 36 subcarriers).

On the other hand, it is adopted to use sequence lengths (N) provided for a DM-RS for PUSCH, for reference signals other than a DM-RS for PUSCH. For example, in a sounding RS of RPF=2 (for distributed FDM transmission) used to measure received quality, ZC sequences (sequence lengths) for a DM-RS are reused.

Thus, the sequence length (N) of a ZC sequence is a sequence length applicable to a DM-RS, that is, the sequence length of the number of RB's that can be represented by multiples of 2, 3 or 5.

The configurations of the terminal and the base station according to Embodiment 7 of the present invention are the same as the configurations shown in FIG. 5 and FIG. 6 in Embodiment 1, and differ from these configurations only in part of the functions, and the different functions will be explained.

In a table, which is provided by sequence length determining section 105 in the terminal and sequence length determining section 164 in the base station and which shows the relationships between the basic sequence length, the transmission bandwidth (i.e. the number of RB's) and the number of cyclic extension and truncation symbols, which vary depending on RPF, the sequence length of the number of RB's close to (transmission bandwidth (RB)/RPF) is set as the basic sequence length among the sequence lengths applicable to a DM-RS. Here, it is preferable to set a sequence length associated with the number of RB's of the integer closest to (transmission bandwidth (RB)/RPF) as the basic sequence length among the sequence lengths applicable to a DM-RS. To be more specific, the sequence length of the maximum number of RB's equal to or less than (transmission bandwidth (RB)/RPF) or the sequence length of the minimum number of RB's equal to or greater than (transmission bandwidth (RB/RPF), is set as the basic sequence length, where these numbers of RB's are applicable to a DM-RS.

Here, it is possible to use only the maximum number of RB's that is equal to or less than (transmission bandwidth (RB)/RPF), use only the minimum number of RB's that is equal to or greater than (transmission bandwidth (RB)/RPF), or use both according to the number of RB's.

A case will be explained below in detail using FIG. 22, where a sequence length associated with the maximum number of RB's that is equal to or less than (transmission bandwidth (RB)/RPF) and that is applicable to a DM-RS, is set as the basic sequence length. First, in a bandwidth in which a data transmission bandwidth is not provided (e.g. in 7 RB's), even the basic sequence length for a DM-RS is not provided. Therefore, for the number of RB's for which the basic sequence length is not provided, it is necessary to generate a ZC sequence of the basic sequence length associated with the number of RB's before or after that number of RB's for which the basic sequence length is not provided, and perform cyclic extension or truncation of the generated ZC sequence to match the transmission bandwidth.

For example, in RPF=1, when the transmission bandwidth (the number of RB's) is 7 RB's, the ZC sequence of the sequence length associated with a transmission bandwidth (the number of RB's) of 6 RB's is generated and is subject to cyclic extension to match the transmission bandwidth. Alternatively, a ZC sequence of the sequence length associated with a transmission bandwidth (the number of RB's) of 8 RB's is generated and is subject to truncation to match the transmission bandwidth.

Further, upon performing transmission with a transmission bandwidth (the number of RB's) of 14 RB's using distributed FDM of RPF=2, the basic sequence length associated with a transmission bandwidth (the number of RB's) of 7 RB's is not provided, and, consequently, a ZC sequence of the basic sequence length of 71 in a transmission bandwidth (the number of RB's) of 6 RB's is generated, and the head part of this ZC sequence is repeated to match the transmission bandwidth. Alternatively, a ZC sequence of the basic sequence length of 89 in a transmission bandwidth (the number of RB's) of 8 RB's is generated, and the tail part of this ZC sequence is removed to match the transmission bandwidth.

Also, to match a ZC sequence to the transmission bandwidth (the number of RB's), it is possible to apply both cyclic extension and truncation or apply only one of cyclic extension and truncation. That is, although ZC sequences of a plurality of bandwidths are generated from a single basic sequence length, it is possible to set the sequence length of the shortest bandwidth (the smallest number of RB's) among the plurality of bandwidths, as the basic sequence length, and apply only cyclic extension, or it is possible to set the sequence length of the longest bandwidth (the largest number of RB's) as the basic sequence length and apply only truncation.

Thus, according to Embodiment 7, by setting, as the basic sequence length, a sequence length associated with the number of RB's close to (transmission bandwidth (RB)/RPF) among the numbers of RB's applicable to a DM-RS, it is possible to select the basic sequence length from sequence lengths associated with the numbers of RB's applicable to the DM-RS, so that it is possible to reduce the amount of information of sequence lengths stored in the base station and the terminal.

Also, although an example case has been described above with the present embodiment using (transmission bandwidth (RB)/RPF), the present invention is not limited to this, and it is equally possible to use, as the basic sequence length, a sequence length close to (the number of transmission subcarriers/RPF) among sequences applicable to a DM-RS.

Also, although a case has been described above with the present embodiment where a sequence length applicable to a DM-RS for PUSCH is used as a reference, the present invention is not limited to this, and it is equally possible to use, for example, the sequence length of an SRS as a reference.

Embodiment 8

The configurations of the terminal and the base station according to Embodiment 8 of the present invention are the same as the configurations shown in FIG. 5 and FIG. 6 in Embodiment 1, and differ from these configurations only in part of the functions, and the different functions will be explained.

The table provided in sequence length determining section 105 of the terminal and sequence length determining section 164 of the base station holds the relationships between the basic sequence length, the transmission bandwidth (the number of RB's) and the number of cyclic extension and truncation symbols, which vary depending on. RPF, for increasing the possible number of cyclic extension and truncation symbols when the basic sequence length increases.

In other words, when the basic sequence length is longer, the possible number of cyclic extension and truncation symbols of a ZC sequence generated from the basic sequence length is increased, and, when the basic sequence length is shorter, the possible number of cyclic extension and truncation symbols of a ZC sequence generated from the basic sequence length is decreased.

Figure 23B:
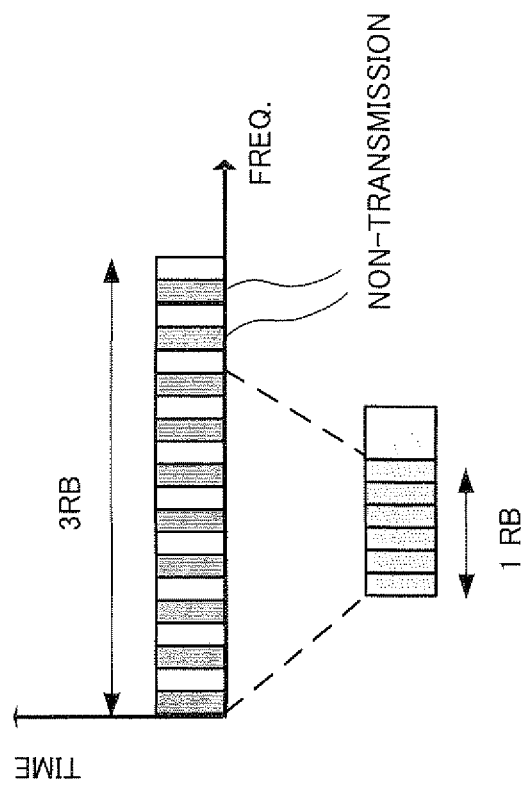
FIG. 23 illustrates a state where transmission is not performed for symbols beyond the possible number of cyclic extension or truncation symbols.
Figure 23A:
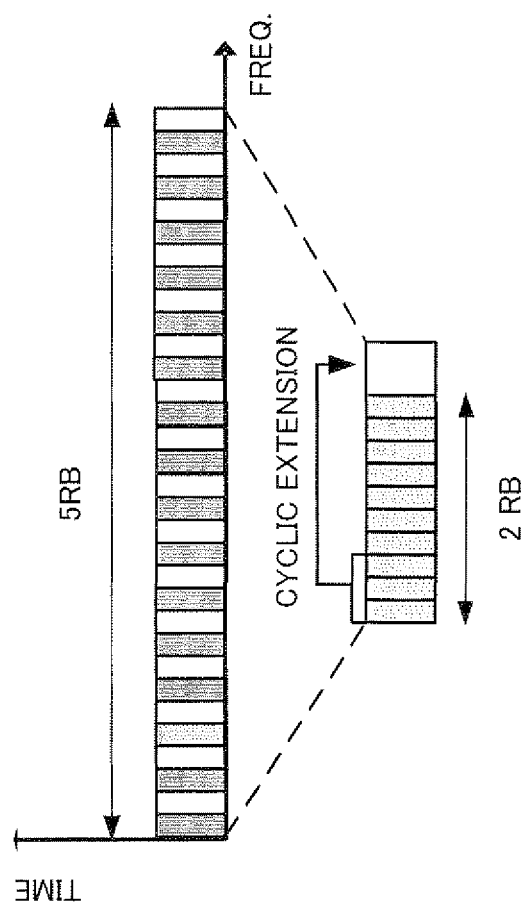

Also, when the number of cyclic extension and truncation symbols is larger than the possible number of cyclic extension and truncation symbols, as shown in FIG. 23, transmission is not performed for symbols beyond the possible number of cyclic extension and truncation symbols. However, although a non-transmission part is provided in the tail of a ZC sequence in FIG. 23B, it is equally possible to provide that part in the head of the ZC sequence or both in the head and in the tail of the ZC sequence.

Thus, according to Embodiment 8, by increasing the possible number of cyclic extension and truncation symbols when the basic sequence length increases and providing a non-transmission part when the number of cyclic extension and truncation symbols is greater than the possible number of cyclic extension and truncation symbols, it is possible to prevent an increase of CM in a ZC sequence of a shorter basic sequence length.

Also, although cases have been described above with Embodiments 6 to 8 using an uplink SRS as an example, it is equally possible to apply the present invention to, for example, a DM-RS, downlink pilot signal and pilot signal for synchronization.

Also, in above Embodiments 1 to 8, it is desirable to set the number of cyclic extension and truncation symbols less than a sequence length, or set the possible number of cyclic extension and truncation symbols less than a sequence length. By this means, it is possible to prevent the same ZC sequence from repeating several times in the frequency domain and prevent the time domain CM characteristics from increasing extremely.

Also, it is possible to replace a reference signal with a pilot signal, basic signal, reference signal, and so on.

Also, in the above embodiments, it is not necessary to apply the present invention to the whole transmission band, and it is equally possible to apply the present invention to a partial transmission bandwidth. Also, it is possible to make exceptions in the case of the shortest basic sequence length or the longest sequence length. For example, although a case has been described above with Embodiment 2 where the number of transmission bandwidths that can be generated from a ZC sequence of a single basic sequence length increases when a transmission bandwidth is longer, in the ZC sequence of the longest sequence length, it is equally possible to decrease the number of transmission bandwidths that can be generated from a ZC sequence of a single basic sequence length. Also, it is not necessary to assign a single basic sequence length to consecutive transmission bandwidths, and it is possible to assign a single basic sequence length to distant transmission bandwidths. For example, it is possible to assign the basic sequence length N(c) to transmission bandwidth a, transmission bandwidth c and transmission bandwidth e, and assign the basic sequence length N(d) to transmission bandwidth b, transmission bandwidth d and transmission bandwidth f.

Also, although cases have been described above with embodiments where the relationships between the transmission bandwidth and the sequence length is common in a plurality of cells, the present invention needs not to be limited to this, and it is equally possible to make the relationships between the transmission bandwidth and the sequence length common in all cells, in cells in which frame synchronization is established, or only in one cell.

Also, although cases have been described above with embodiments using an uplink as an example, it is equally possible to apply the present invention to a downlink. Further, the present embodiments are not limited to the 3GPP LTE system.

Also, although cases have been described above with embodiments using a ZC sequence of an odd-number sequence length, it is equally possible to apply the present invention to other sequences than a ZC sequence of an odd-number sequence length in the same way as long as a coding sequence is used. For example, it is equally possible to apply the present invention even to a ZC sequence of an even-number sequence length. Also, it is equally possible to apply the present invention to a GCL (Generalized Chirp Like) sequence incorporating a ZC sequence. Further, it is possible to apply a Frank sequence, a PN sequence such as an M sequence and gold sequence, a sequence acquired by performing cyclic extension or truncation of a CAZAC-based sequence, a sequence puncturing a ZC sequence, various sequences such as random CAZAC, OLZC and RAZA, and other CAZAC sequences (including a sequence generated by computer).

The above GCL sequence will be shown below using an equation. A GCL sequence of the sequence length N is represented by equation 5 when "N" is an even number, or represented by equation 6 when "N" is an odd number.

(Equation 5)
$$c_{r,m}(k) = \exp\left\{-j\frac{2\pi r}{N}\left(\frac{k^2}{2} + qk\right)\right\}b_i(k \bmod m) \quad [5]$$

(Equation 6)
$$c_{r,m}(k) = \exp\left\{-j\frac{2\pi r}{N}\left(\frac{k(k+1)}{2} + qk\right)\right\}b_i(k \bmod m) \quad [6]$$

Here, k=0, 1, 2, ..., N−1, q is an arbitrary integer, r is coprime with N and lower than N, bi (k mod m) is an arbitrary complex number where i=0, 1, ..., m−1. Also, to minimize the cross correlation between GCL sequences, an arbitrary complex number of amplitude 1 is used as bi (k mod m).

Thus, a GCL sequence is a sequence multiplying a Zadoff-Chu sequence by bi (k mod in).

Also, although cases have been described above with embodiments where determination of the sequence length based on transmission bandwidth information, generation of a ZC sequence, and cyclic extension and truncation processing are performed in order, the present invention is not limited to this, and it is equally possible to employ a configuration of holding and referring to a table associating in advance sequences including sequences subjected to cyclic extension or truncation with individual transmission bandwidth information.

Although a case has been described above with the above embodiments as an example where the present invention is implemented with hardware, the present invention can be implemented with software.

Furthermore, each function block employed in the description of each of the aforementioned embodiments may typically be implemented as an LSI constituted by an integrated circuit. These may be individual chips or partially or totally contained on a single chip. "LSI" is adopted here but this may also be referred to as "IC," "system LSI," "super LSI," or "ultra LSI" depending on differing extents of integration.

Further, the method of circuit integration is not limited to LSI's, and implementation using dedicated circuitry or general purpose processors is also possible. After LSI manufacture, utilization of an FPGA (Field Programmable Gate Array) or a reconfigurable processor where connections and settings of circuit cells in an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

Also, in the above embodiments, a base station may be referred to as "Node B," a terminal may be referred to as "UE," and a subcarrier may be referred to as "tone."

The disclosures of Japanese Patent Application No. 2007-207186, filed on Aug. 8, 2007, and Japanese Patent Application No. 2007-279224, filed on Oct. 26, 2007, including the specifications, drawings and abstracts, are incorporated herein by reference in their entireties.

INDUSTRIAL APPLICABILITY

The wireless transmitting apparatus and wireless communication method according to the present invention can reduce interference between sequences and reduce the circuit scale and the amount of calculations even when RS's are transmitted by different transmission bandwidths, and are applicable to, for example, a wireless communication base station apparatus and wireless communication terminal apparatus in a mobile communication system.

The invention claimed is:

1. A wireless transmitting apparatus comprising:
a sequence length determining section configured to determine a basic sequence length of a constant amplitude and zero-autocorrelation code (CAZAC) sequence associated with a transmission bandwidth indicated by acquired transmission bandwidth information, according to an association relationship between the basic sequence length of the CAZAC sequence and a plurality of transmission bandwidths to which the CAZAC sequence is allocated;
a sequence generating section configured to generate a CAZAC sequence associated with the determined basic sequence length; and
a transmitting section configured to transmit the generated CAZAC sequence as a reference signal, wherein:
the association relationship (i) provides a grouping of the plurality of transmission bandwidths to which the CAZAC sequence is allocated into a plurality of transmission bandwidth groups, each transmission bandwidth group comprising at least a first transmission bandwidth and a second transmission bandwidth, and (ii) defines a first prime number that is nearest to and less than the first transmission bandwidth and a second prime number that is nearest to and less than the second transmission bandwidth, the first prime number and the second prime number being different from each other, and
when the acquired transmission bandwidth information indicates the first transmission bandwidth, the sequence length determining section is configured to determine the sequence length having the second prime number, as the basic sequence length of the CAZAC sequence.

2. The wireless transmission apparatus according to claim 1, further comprising a cyclic extension and truncation processing section that performs one of cyclic extension processing and truncation processing on the CAZAC sequence, based on a number of cyclic extension or truncation symbols, wherein the sequence length determining section determines a difference between the transmission bandwidth and the determined basic sequence length associated with the transmission bandwidth, as the number of cyclic extension or truncation symbols.

3. The wireless transmission apparatus according to claim 2, wherein, when the transmission bandwidth indicated by the acquired transmission bandwidth information is narrower, the sequence length determining section decreases a possible number of cyclic extension or truncation symbols, which represents a maximum possible number of symbols subject to cyclic extension or truncation, and, when the transmission bandwidth indicated by the acquired transmission bandwidth information is wider longer, increases the possible number of cyclic extension or truncation symbols.

4. The wireless transmission apparatus according to claim 1, wherein the sequence length determining section holds association relationships associating the basic sequence length with a smaller number of transmission bandwidths when the transmission bandwidth to which a reference signal is allocated is narrower, and associating the basic sequence length with a larger number of transmission bandwidths when the transmission bandwidth is wider.

5. The wireless transmission apparatus according to claim 1, wherein the transmitting section transmits the CAZAC sequence by distributed frequency division multiplexing to perform allocation at constant subcarrier intervals.

6. The wireless transmission apparatus according to claim 1, wherein the sequence length determining section holds an association relationship associating a single basic sequence length with a plurality of sounding reference signal (SRS) transmission bandwidths including at least a first SRS transmission bandwidth nearest to the sequence length having the first prime number and a second SRS transmission bandwidth nearest to the sequence length having the first prime number and a second SRS transmission bandwidth nearest to the sequence length having the second prime number different from the first prime number.

7. A wireless transmitting apparatus comprising:
a sequence length determining section configured to associate a constant amplitude and zero-autocorrelation code sequence of a common basic sequence length with a plurality of transmission bandwidths to which a reference signal is allocated, and to determine a basic sequence length associated with a transmission bandwidth indicated by acquired transmission bandwidth information;
a sequence generating section configured to generate a constant amplitude and zero-autocorrelation code sequence associated with the determined basic sequence length; and
a transmitting section configured to transmit the generated constant amplitude and zero-autocorrelation code sequence as a reference signal; and
a cyclic extension and truncation processing section configured to perform one of cyclic extension processing and truncation processing on the constant amplitude and zero-autocorrelation code sequence of the basic sequence length, based on a number of cyclic extension and truncation symbols, wherein the sequence length determining section determines a difference between the transmission bandwidth and the basic sequence length associated with the transmission bandwidth, as the number of cyclic extension and truncation symbols,
wherein the sequence length determining section determines a possible number of cyclic extension and truncation symbols that represents a maximum possible number of symbols subject to cyclic extension or truncation, so as to make equal a ratio between the possible number of cyclic extension and truncation symbols and the basic sequence length in the plurality of transmission bandwidths to which the reference signal is allocated.

8. A wireless transmission apparatus comprising:
a sequence length determining section configured to associate a constant amplitude and zero-autocorrelation code sequence of a common basic sequence length with a plurality of transmission bandwidths to which a reference signal is allocated, and to determine a basic sequence length associated with a transmission bandwidth indicated by acquired transmission bandwidth information;
a sequence generating section configured to generate a constant amplitude and zero-autocorrelation code sequence associated with the determined basic sequence length; and
a transmitting section configured to transmit the generated constant amplitude and zero-autocorrelation code sequence as a reference signal; and
a cyclic extension and truncation processing section configured to perform one of cyclic extension processing and truncation processing on the constant amplitude and zero-autocorrelation code sequence of the basic sequence length, based on a number of cyclic extension and truncation symbols, wherein the sequence length determining section determines a difference between the transmission bandwidth and the basic sequence length associated with the transmission bandwidth, as the number of cyclic extension and truncation symbols, wherein the sequence length determining section holds association relationships between a basic sequence length, a transmission bandwidth and a number of cyclic extension symbols on a per repetition factor basis, and determines, as a basic sequence length, a sequence length associated with a number of repetition factors of an integer close to a result of dividing a transmission bandwidth represented by a number of resource blocks by a repetition factor.

9. The wireless transmission apparatus according to claim 8, wherein the sequence length determining section determines, as the basic sequence length, a sequence length that is applicable to a demodulation reference signal and that is associated with one of a maximum number of reference signals equal to or less than a result of dividing a transmission bandwidth represented by a number of reference signals by a repetition factor and a minimum number of reference signals greater than a result of dividing the transmission bandwidth represented by a number of reference signals by the repetition factor.

10. The wireless transmission apparatus according to claim 8, wherein the sequence length determining section increases a possible number of cyclic extension or truncation symbols when the basic sequence length increases.

11. The wireless transmission apparatus according to claim 10, wherein the sequence length determining section provides a non-transmission symbol when the number of cyclic extension and truncation symbols is greater than the possible number of cyclic extension or truncation symbols.

12. A wireless transmission apparatus comprising:
a sequence length determining section configured to associate a constant amplitude and zero-autocorrelation code sequence of a common basic sequence length with a plurality of transmission bandwidths to which a reference signal is allocated, and to determine a basic sequence length associated with a transmission bandwidth indicated by acquired transmission bandwidth information;
a sequence generating section configured to generate a constant amplitude and zero-autocorrelation code sequence associated with the determined basic sequence length; and
a transmitting section configured to transmit the generated constant amplitude and zero-autocorrelation code sequence as a reference signal; and
a cyclic extension and truncation processing section configured to perform one of cyclic extension processing and truncation processing on the constant amplitude and zero-autocorrelation code sequence of the basic sequence length, based on a number of cyclic extension and truncation symbols, wherein the sequence length determining section determines a difference between the transmission bandwidth and the basic sequence length associated with the transmission bandwidth, as the number of cyclic extension and truncation symbols,
wherein the sequence length determining section holds association relationships between a basic sequence length, a transmission bandwidth and a number of cyclic extension symbols on a per repetition factor basis, and determines, as a basic sequence length, a sequence length of an integer close to a result of dividing a number of transmission subcarriers by a repetition factor, among sequence lengths available for the repetition factor of "1."

13. A wireless communication method comprising:
determining a basic sequence length of a constant amplitude and zero-autocorrelation code (CAZAC) sequence associated with a transmission bandwidth indicated by acquired transmission bandwidth information, according to an association relationship between the basic sequence length of the CAZAC sequence and a plurality of transmission bandwidths to which the CAZAC sequence is allocated; and
generating a CAZAC sequence associated with the determined basic sequence length, wherein:
the association relationship (i) provides a grouping of the plurality of transmission bandwidths to which the CAZAC sequence is allocated into a plurality of transmission bandwidth groups, each transmission bandwidth group comprising at least a first transmission bandwidth and a second transmission bandwidth, and (ii) defines a first prime number that is nearest to and less than the first transmission bandwidth and a second prime number that is nearest to and less than the second transmission bandwidth, the first prime number and the second prime number being different from each other, and
when the acquired transmission bandwidth information indicates the first transmission bandwidth, the sequence length determining section is configured to determine the sequence length having the second prime number, as the basic sequence length of the CAZAC sequence.

14. A wireless reception apparatus comprising:
a sequence length determining section configured to determine a basic sequence length of a constant amplitude and zero-autocorrelation code (CAZAC) sequence associated with a transmission bandwidth indicated by acquired transmission bandwidth information, according to an association relationship between the basic sequence length of the CAZAC sequence and a plurality of transmission bandwidths to which the CAZAC sequence is allocated;
a cyclic extension and truncation processing;
a sequence generating section configured to generate a CAZAC sequence associated with the determined basic sequence length; and
a channel estimation section configured to estimate channel quality using the CAZAC sequence, wherein:
the association relationship (i) provides a grouping of the plurality of transmission bandwidths to which the CAZAC sequence is allocated into a plurality of transmission bandwidth groups, each transmission bandwidth group comprising at least a first transmission bandwidth and a second transmission bandwidth, and (ii) defines a first prime number that is nearest to and less than the first transmission bandwidth and a second prime number that is nearest to and less than the second transmission bandwidth, the first prime number and the second prime number being different from each other, and
when the acquired transmission bandwidth information indicates the first transmission bandwidth, the sequence length determining section is configured to determine the sequence length having the second prime number, as the basic sequence length of the CAZAC sequence.

15. The wireless reception apparatus according to claim 14, further comprising a cyclic extension and truncation processing section that performs one of cyclic extension processing and truncation processing on the CAZAC sequence, based on a number of cyclic extension or truncation symbols,
wherein the sequence length determining section determines a difference between the transmission bandwidth and the determined basic sequence length associated with the transmission bandwidth, as the number of cyclic extension or truncation symbols.

16. The wireless reception apparatus according to claim 15, wherein, when the transmission bandwidth indicated by the acquired transmission bandwidth information is narrower, the sequence length determining section decreases a possible number of cyclic extension or truncation symbols, which represents a maximum possible number of symbols subject to cyclic extension or truncation, and, when the transmission bandwidth indicated by the acquired transmission bandwidth information is wider, increases the possible number of cyclic extension or truncation symbols.

17. The wireless reception apparatus according to claim 15, wherein the sequence length determining section determines a possible number of cyclic extension or truncation symbols that represents a maximum possible number of symbols subject to cyclic extension or truncation, so as to make equal a ratio between the possible number of cyclic extension or truncation symbols and the basic sequence length in the plurality of transmission bandwidths to which the reference signal is allocated.

18. The wireless reception apparatus according to claim 15, wherein the sequence length determining section holds association relationships between a basic sequence length, a transmission bandwidth and a number of cyclic extension symbols on a per repetition factor basis, and determines, as a basic sequence length, a sequence length associated with a number of repetition factors of an integer close to a result of dividing a transmission bandwidth represented by a number of resource blocks by a repetition factor.

19. The wireless reception apparatus according to claim 18, wherein the sequence length determining section determines, as the basic sequence length, a sequence length that is applicable to a demodulation reference signal and that is associated with one of a maximum number of reference signals equal to or less than a result of dividing a transmission bandwidth represented by a number of reference signals by a repetition factor and a minimum number of reference signals greater than a result of dividing the transmission bandwidth represented by a number of reference signals by the repetition factor.

20. The wireless reception apparatus according to claim 18, wherein the sequence length determining section increases a possible number of cyclic extension or truncation symbols when the basic sequence length increases.

21. The wireless reception apparatus according to claim 20, wherein the sequence length determining section provides a non-transmission symbol when the number of cyclic extension and truncation symbols is greater than the possible number of cyclic extension or truncation symbols.

22. The wireless reception apparatus according to claim 15, wherein the sequence length determining section holds association relationships between a basic sequence length, a transmission bandwidth and a number of cyclic extension symbols on a per repetition factor basis, and determines, as a basic sequence length, a sequence length of an integer close to a result of dividing a number of transmission subcarriers by a repetition factor, among sequence lengths available for the repetition factor of "1."

23. The wireless reception apparatus according to claim 14, wherein the sequence length determining section holds association n relationships associating the basic sequence length with a smaller number of transmission bandwidths when the transmission bandwidth to which a reference signal is allocated is narrower, and associating the basic sequence length with a larger number of transmission bandwidths when the transmission bandwidth is wider.

24. The wireless reception apparatus according to claim 14, wherein the transmitting section transmits the CAZAC sequence by distributed frequency division multiplexing to perform allocation at constant subcarrier intervals.

25. The wireless reception apparatus according to claim 14, wherein the sequence length determining section holds an association relationship associating a single basic sequence length with a plurality of sounding reference signal (SRS) transmission bandwidths including at least a first SRS transmission bandwidth nearest to the sequence length having the first prime number and a second SRS transmission bandwidth nearest to the sequence length having the second prime number different from the first prime number.

26. A channel estimation method comprising:
determining a basic sequence length of a constant amplitude and zero-autocorrelation code (CAZAC) sequence associated with a transmission bandwidth indicated by acquired transmission bandwidth information, according to an association relationship between the basic sequence length of the CAZAC sequence and a plurality of transmission bandwidths to which the CAZAC sequence is allocated;
a cyclic extension and truncation processing;
generating a CAZAC sequence associated with the determined basic sequence length; and
estimating channel quality using the CAZAC sequence, wherein:
the association relationship (i) provides a grouping of the plurality of transmission bandwidths to which the CAZAC sequence is allocated into a plurality of transmission bandwidth groups, each transmission bandwidth group comprising at least a first transmission bandwidth and a second transmission bandwidth, and (ii) defines a first prime number that is nearest to and less than the first transmission bandwidth and a second prime number that is nearest to and less than the second transmission bandwidth, the first prime number and the second prime number being different from each other, and
when the acquired transmission bandwidth information indicates the first transmission bandwidth, the sequence length determining section is configured to determine the sequence length having the second prime number, as the basic sequence length of the CAZAC sequence.

* * * * *